United States Patent [19]

Sasaki et al.

[11] Patent Number: 4,872,590
[45] Date of Patent: * Oct. 10, 1989

[54] RESIN COATED CAN WITH FOLDED SEAM

[75] Inventors: Hitoshi Sasaki; Shoji Igota, both of Kawasaki, Japan

[73] Assignee: Ajinomoto Co., Inc., Tokyo, Japan

[*] Notice: The portion of the term of this patent subsequent to Feb. 10, 2004 has been disclaimed.

[21] Appl. No.: 892,465

[22] Filed: Aug. 5, 1986

Related U.S. Application Data

[63] Continuation of Ser. No. 736,969, May 22, 1985, abandoned, which is a continuation-in-part of Ser. No. 531,994, Sep. 14, 1983, abandoned.

[30] Foreign Application Priority Data

Dec. 3, 1982 [JP] Japan ................................ 57-212519
Dec. 3, 1982 [JP] Japan ................................ 57-212520
Dec. 3, 1982 [JP] Japan ................................ 57-212521
May 22, 1983 [JP] Japan ................................ 58-89861

[51] Int. Cl.⁴ ...................... B65D 25/14; B65D 8/08
[52] U.S. Cl. ........................................ 220/457; 53/373; 220/67; 220/417; 220/455; 229/4.5; 428/34.7
[58] Field of Search .............. 229/4.5, 5.5, 93, 48 T, 229/3.1, 48 X; 220/66, 67, 417, 418, 454, 457, 414, 461, 453, 455; 156/193, 195, 200–203, 272.2; 53/371, 373, 375; 493/108, 110; 428/35, 36

[56] References Cited

U.S. PATENT DOCUMENTS

| | | | |
|---|---|---|---|
| Re. 26,273 | 9/1967 | Kennedy, Jr. ................ | 229/4.5 |
| 1,944,970 | 1/1934 | Dreffenbach ................ | 156/195 |
| 1,973,317 | 9/1934 | Hurley ...................... | 229/4.5 |
| 3,032,251 | 5/1962 | Jarund ...................... | 229/48 T |
| 3,055,784 | 9/1962 | Roedel ...................... | 229/3.1 |
| 3,092,248 | 6/1963 | Lane et al. ................. | 229/22 |
| 3,098,582 | 7/1963 | Martin ...................... | 229/5.7 |
| 3,371,002 | 2/1968 | Reddeman .................. | 229/3.1 |
| 3,406,891 | 10/1968 | Buchner et al. . | |
| 3,428,239 | 2/1969 | Wannamaker et al. .......... | 229/5.6 |
| 3,540,490 | 11/1970 | Jensen . | |
| 3,695,971 | 10/1972 | Corning, Jr. ................ | 156/195 |
| 4,120,323 | 10/1978 | Saul ......................... | 229/4.5 X |
| 4,139,114 | 2/1979 | Long et al. .................. | 229/22 X |
| 4,155,794 | 5/1979 | Raabe et al. ................. | 220/66 X |
| 4,210,618 | 7/1980 | Piltz et al. .................. | 229/43 X |
| 4,241,834 | 12/1980 | Beauchamp ................. | 206/611 |
| 4,309,333 | 1/1982 | Silberberg .................. | 524/451 X |
| 4,526,823 | 7/1985 | Farrell et al. ................ | 229/4.5 X |

FOREIGN PATENT DOCUMENTS

1191838  1/1963  France .................................. 229/4.5

Primary Examiner—Bryan Gehman
Attorney, Agent, or Firm—Oblon, Spivak, McClelland, Maier & Neustadt

[57] ABSTRACT

A plastic can is formed of a body member including a content protecting layer which is a tubular body formed by folding back and outward one side edge of a laminated film, bonding the folded parts such that air bubbles are not entrapped thereunder, overlapping the other side edge of the same laminated film on the bonded surface and bonding the side edges such that air bubbles are not entrapped between the side edges. An additional sheet is bonded all over the external surface of the laminated film except for a projecting stripe formed by the bonding of the side edges. A surfacing plastic layer covers the additional sheet and the projecting stripes. An apparatus is provided for forming the can, smoothing the surfacing plastic layer, forming the tube into can bodies, shaping the can bodies and sealing, lids on the ends of the cans.

3 Claims, 17 Drawing Sheets

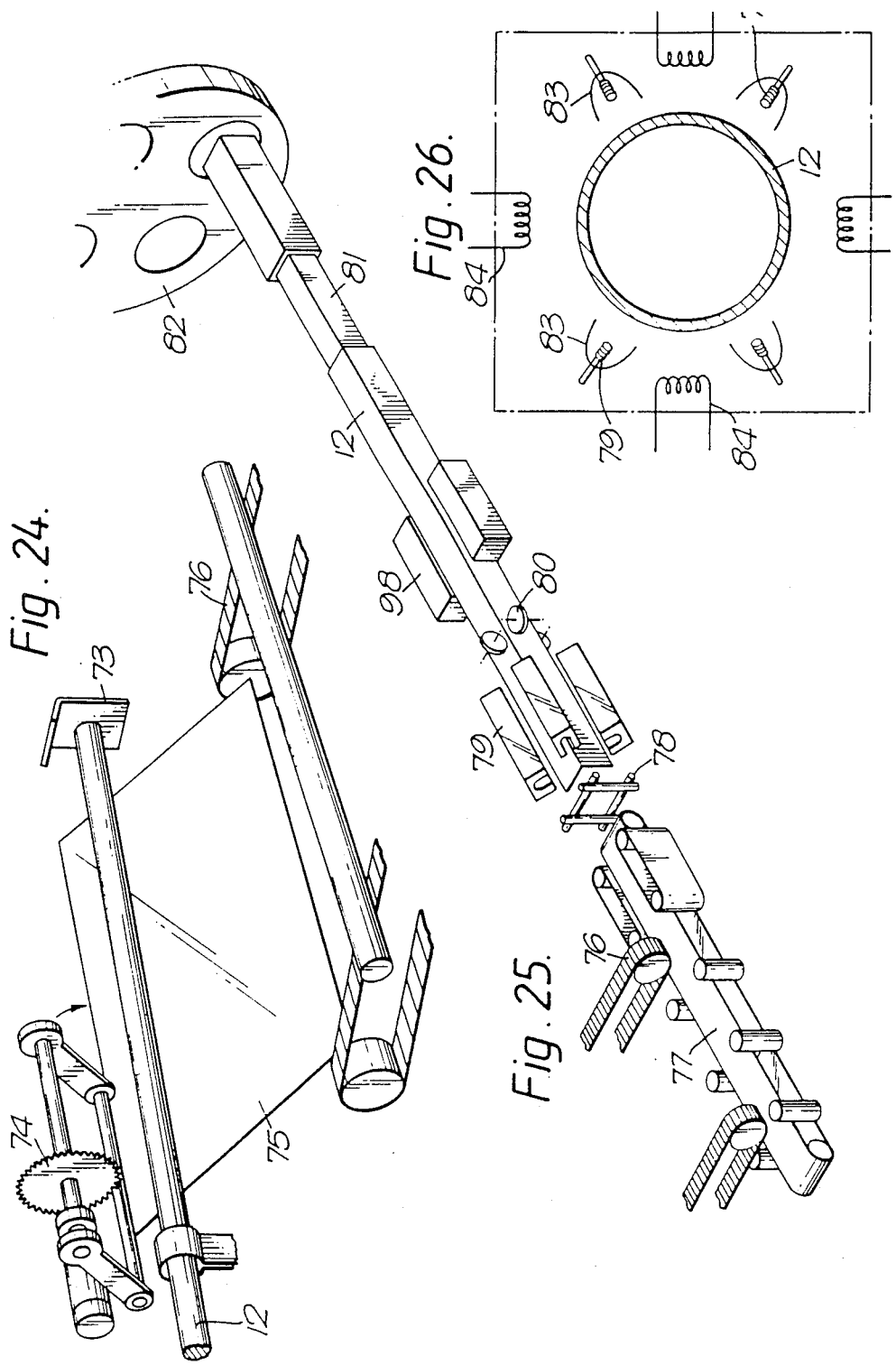

RESIN COATED CAN WITH FOLDED SEAM

This application is a continuation of application Ser. No. 730,969, filed May 22, 1985, now abandoned, which is a Continuation-In Part, of application Ser. No. 531,994, filed Sept. 14, 1983, now abandoned.

BACKGROUND OF THE INVENTION

1. Field of the Invention:

The present invention relates to a plastic can which is suitable for containing, for example, foods and drinks, and to an apparatus for producing the same.

2. Description of the Prior Art:

It goes without saying that containers for foods and drinks should have no sanitary problems. In addition, they are required to have various physical properties such as water resistance, oil resistance, ability to be retorted for sterilization, self-supporting ability, and gas barrier properties, according to applications. Metal cans meet these requirements, but they have disadvantages. That is, the environmental pollution by used cans is becoming a social problem. Also, transporting bulky empty metal cans from the point of production to the point of filling is a waste.

On the other hand, plastics are being used as the materials for various containers because of their ease of molding and fabrication. However, plastics have not yet been put into practical use for food and drink containers where metal cans are dominant, because plastics must not only have the aforesaid properties but also be low in cost.

Heretofore, the technology for producing the body of a plastic can from a material composed mainly of plastic has not been developed, because plastics have a problem with respect to their physical properties, particularly a problem with heat treatment.

SUMMARY OF THE INVENTION

The present inventors have found that if this problem can be solved in the case of a plastic can having such a structure that the can body has a content protecting layer and an external supporting layer, the tubular part of the content protecting layer being uniform and resistant to deformation. As the result of continued research on this subject, the present inventors found that troubles are attributable mostly to deformation caused by heat shrinkage of plastic and to air bubbles entrapped in plastic. The present inventors have further found a means to solve these problems.

In the plastic can of the present invention, the content protecting layer is a tubular body formed by folding back and outward one side edge of a laminated film bonding the folded part such that air bubbles are not entrapped thereunder, and overlapping the other side edge of the same laminated film on the folded surface and bonding them such that air bubbles are not entrapped between them. An apparatus for producing the same forms another part of the invention.

The laminated film constituting the content protecting layer may be of different construction according to the intended use. If the plastic can of this invention is to be used as a food and drink container in place of metal cans, the innermost layer which comes into contact with food and drink should be made of a polyolefin selected from polyethylene, polypropylene, or ethylene-propylene copolymer. The preferred polyethylene is high-density polyethylene from the standpoint of compatability with retorting. The laminated film should preferably have an intermediate layer of ethylene-vinyl alcohol copolymer or polyvinylidene chloride having gas barrier properties. An intermediate layer of aluminum foil is most suitable for providing gas barrier properties. Also, the laminated film should have an outermost layer of plastic which protects the intermediate layer. This layer, if provided, may be made of the same polyolefin as used for the innermost layer. The intermediate layer may be laminated with various materials according to the intended use. Moreover, an adhesive layer is interposed between the layers, as required. A proper adhesive is selected according to the two layers to be bonded. For instance, carboxylic acid-grafted polypropylene or urethane-based adhesive is suitable for bonding a polyolefin layer to an aluminum foil. The thickness of the laminated film is determined in consideration of the thickness of the tubular body which is the body member of the plastic can of this invention. It is usually smaller than 250 $\mu$, and preferably from 50 to 150 $\mu$.

The sealing system as mentioned above performs dual sealing which ensures complete sealing.

So far, the present invention has been described with reference to preferred embodiments; but the scope of this invention is not limited to them. Any type of laminated material can be used for the body member. In the above-mentioned example, the space between the projecting stripes 7 is filled with the additional sheet 9; but this additional sheet 9 may be omitted if the irregularities on the body are acceptable and they have nothing to do with strength, etc. An adhesive is used in the case where fusion bonding is difficult to perform or heating for fusion-bonding deforms the entire shape. It goes without saying that the adhesive should be used properly according to the construction of the body member and the apparatus for producing the body member.

As a variation, the additional sheet 9 can be replaced by a melted extruded plastic layer for the convenience of adhesion, the melt extruded plastic is desired to be of the same kind as the outermost layer of the laminated film. This plastic may be of a type incorporating such an inorganic substance as calcium carbonate. The incorporation of this inorganic substance enhances rigidity, lowers the calorific requirement for combustion, ensures ease of disposal by incineration, decreases the unit price per weight, and promises a cut of cost. In addition thereto, the incorporation of the above inorganic substance lowers heat conductivity in comparison to those made of plastic only (without inorganic substance). Therefore, when a food or the like is filled up in the can, and then is retorted for sterilization, the can made of the inorganic substance incorporating melt extruded plastic has an advantage over that without inorganic substance. Generally, the amount of the plastic so extruded must be enough to fill out the space between the raised strips.

To permit manufacture of the tube for the can body, the conventional production apparatus has only to be supplemented with a die for extruding the molten plastic and a mechanism for applying the molten plastic on the laminated film and immediately cooling the applied molten plastic. The die is disposed advantageously at a proper position on the downstream side of the edge-folding device and preceding the step for winding the film on the mandrel. By allowing the molten plastic to be applied on the film at this particular position, the application at the prescribed position can be obtained with ease and, at the same time, the subsequent cooling of the applied molten plastic and the uniformity of the thickness of the applied layer of plastic can be effected easily. As the cooling mechanism, a cooled roll may be used, for example. This cooling must be carried out immediately after the application of the molten plastic lest the laminated film should be deformed by the heat of the molten plastic. The part of the laminated film folded back at one lateral edge (edge-folded part) is desired to be welded in advance.

Incidentally, this invention has no need for the sizing device and the hot air drier used in the first embodiment. Costs for such apparatus are thus not needed. In addition, it takes a long time for complete adhesion in the conventional laminated film, however according to this embodiment complete adhesion can be achieved after completion of cooling. Therefore, the tube with high qualities can be produced without trouble.

BRIEF DESCRIPTION OF THE DRAWINGS

FIG. 24 is a perspective view showing an example of the apparatus for cutting the formed tubular body in lengths;

FIG. 25 is a schematic drawing illustrating an example of the square tube forming apparatus which forms a round tube into a square tube;

FIG. 26 is a schematic drawings illustrating the heating unit of the square tube forming apparatus;

DETAILED DESCRIPTION OF THE PREFERRED EMBODIMENTS

Figure 1:
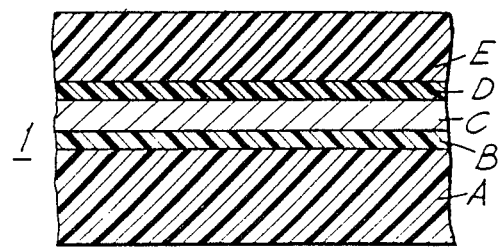
FIG. 1 is a sectional view of one example of the laminated film.

FIG. 1 shows a cross section of one example of the laminated film 1 for a food container. It is composed of a 70 $\mu$ thick polypropylene layer A (the innermost layer), a 7 $\mu$ thick carboxylic acid-grafted polypropylene layer B (Liothene, a product of Toyo Ink Mfg. Co., Ltd.), a 9 $\mu$ thick aluminum foil C, a urethane-based adhesive layer D (4.5 g/m$^2$), and a 30 $\mu$ polypropylene layer E (the outermost layer), laminated one over another in the order listed. The laminated film 1 of such structure is superior in physical properties such as water resistance and oil resistance and is suitable for food and drink containers. Moreover, it is resistant to the heat of retorting.

Figure 2:
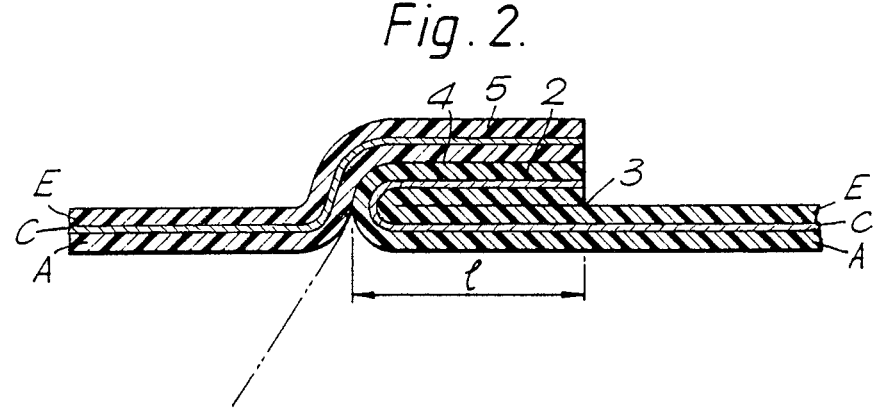
FIG. 2. is a sectional view showing the adhesion of the side edges of the laminated film.

FIG. 2 is a cross section showing one side edge 2 of the laminated film 1, which is folded back and bonded at 3, and the other side edge 5 of the same laminated film 1, which is overlapped on and bonded to the folded surface 4 of the edge 2. The side edge 2 of the laminated film 1 is folded back and outward and is bonded in such a manner than air bubbles are not entrapped under the folded part 2. The side edge 2 is folded back and outward so that the cut end of the laminated film 1 does not come into contact with the contents of the can. This protects the contents of the can from being affected by the intermediate layer C, the adhesive layers B and D or the outermost layer E (although in the example as shown in FIG. 1 A,B,C,E is not a problem). The width l of folded back portion varies depending on the diameter of the tube, the bonding strength, and the degree of airtightness required; usually it is 2 to 20 mm. The folded part 2 is bonded at 3 in such a manner that air bubbles are not entrapped thereunder. Bonding may be accomplished with an adhesive, but is usually performed by fusion bonding because the surfaces of the same material face each other. This bonding prevents irregularities from occurring on the tubular body 12 due to springing back of the folded part 2. Moreover, this bonding eliminates air bubbles that might expand to lift the molten plastics coated thereon by the T-die 29, causing irregularities on the surface of the body member. Preventing the occurrence of surface irregularities is important for the appearance of the finished can. It is also important if the lid is to be fitted easily and securely. In addition, eliminating air bubbles prevents uneven heating during retorting.

A test for the appearance and the fitting of the lid 13 (FIG. 10) was carried out using the body member 12a prepared in such a manner that the presence of air bubbles was permitted. The appearance was so poor that it was impossible to hide the surface irregularities with direct printing, a paper label, or a plastic label which are commonly used for blow-molded or injection-molded plastic containers. The lid 13 was fitted to the body member 12a using a high-frequency heater and an infrared line heater, which are mentioned later. But, it was impossible to contact bond uniformly over the entire periphery of the lid 13, because the open lid 110 of the body member 12a was deformed in conformity with the aforementioned irregularities. About a 5% failure rate occurred in sealing. The surface irregularities are fatal; but it is possible to obtain a uniform and smooth body member 12a by eliminating entrapped air bubbles. As the result, it became possible to perform direct printing and secure sealing.

The other side edge 5 of the same laminated film is overlapped on and bonded to the folded surface 4 of edge 2 in such a manner that air bubbles are not entrapped thereunder. Air bubbles are eliminated for the same reason as mentioned above. Bonding should preferably be performed by fusion bonding.

Figure 3:
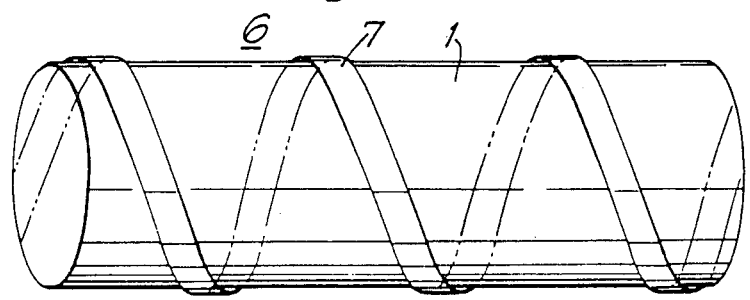
FIG. 3 is a perspective view showing the bonded side edges.

The overlapping and bonding of the side edges 2 and 5 form the tube 6. The tube 6 may be formed by spirally winding the laminated films 1, as shown in FIG. 3, or by butt sealing the two side edges 2 and 5 of the laminated film 1.

Figure 4:
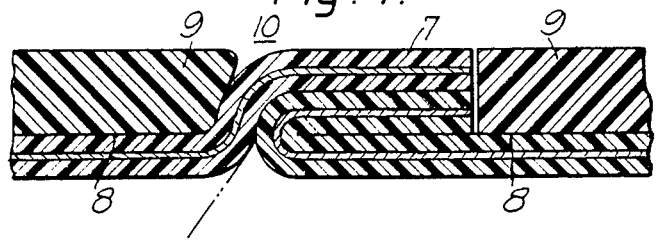
FIG. 4 is a sectional view showing the adhesion of the side edges of the laminated film, with the additional sheet laminated.

The tube 6 thus formed may be used as the body member; but it is also possible to use this tube 6 as the content protecting layer and to laminate a supporting layer onto the outside thereof. In such a case, wherein the projecting stripe 7 is formed on the tube 6 by the bonding of the two side edges 2 and 5 (FIG. 2), it is desirable to smooth the surface by bonding an additional sheet 9, which has a thickness almost equal to the height of the projecting stripe 7, all over the external surface 8 of the laminated film, except the projecting stripe 7. FIG. 4 shows a cross section of the laminated film, with the additional sheet 9 bonded thereon. The material of the additional sheet may be selected according to the intended use of the can. In the illustrated example, a 200 μ thick polypropylene film is bonded by using a urethane-based adhesive.

A further film may be laminated, in addition to the additional sheet 9, on the supporting layer outside the tube 6. For instance, a polyolefin 11a incorporated with an inorganic matter may be coated on the tube. This imparts rigidity to the tube 6, increasing its load bearing ability, facilitates the fitting of the lid and reduces changes of the can volume. Laminating a polyolefin incorporated with an inorganic matter has another advantage. That is, the inorganic matter lowers the heat of combustion and prevents the plastic from melting and flowing during combustion. Thus, waste cans can be held upright during their incineration. Moreover, the inorganic matter improves thermal conductivity, so that the contents of the can can be heated or cooled rapidly and uniformly.

The inorganic matter is powder of calcium carbonate, talc, and mica. Calcium carbonate and talc are preferred. It is incorporated in an amount of 20 to 90 wt%, preferably 40 to 70 wt%. For rapid and uniform mixing, it is recommended to add a titanium coupling agent such as isopropyl triisostearoyl titanate, a silane coupling agent such as tetra-n-butoxysilane, or a zirconium coupling agent such as tetra-n-butoxy zirconium, to the inorganic matter in an amount of 0.1 to 10 wt%, and preferably 0.5 to 3 wt%. The mixture may be further incorporated with a pigment such as titanium oxide for the purpose of coloring.

Figure 6:
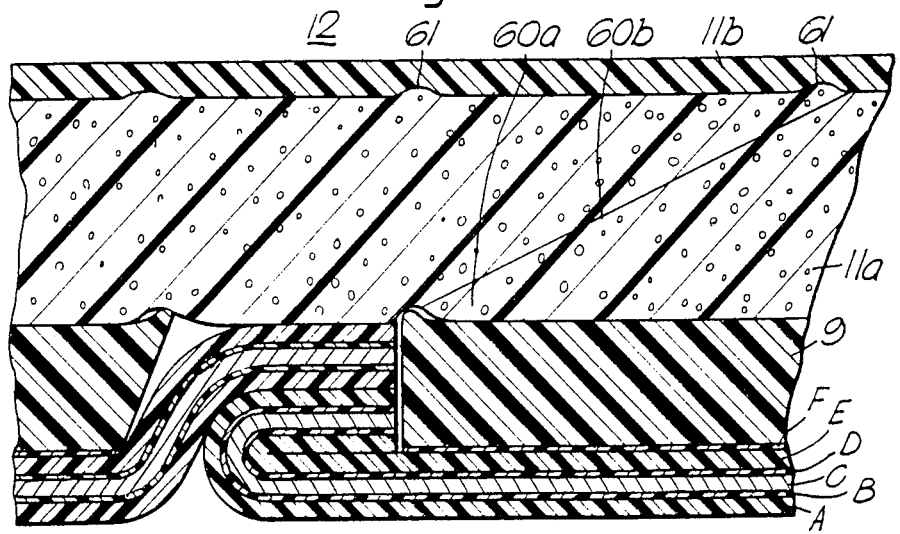
FIG. 6 is an enlarged sectional view of the completed tubular body.

The following table shows the properties of 50/50 mixture of polypropylene and calcium carbonate or talc. The table also shows the physical properties of the tubular body 12 constructed as shown in FIG. 6 (except that the layer 11b is absent), as described below.

(a) Properties of mixture

|  | PP 50%/ CaCO$_3$ 50% | PP 50%/ talc 50% | PP 100% (control) |
|---|---|---|---|
| Stiffness | 2.4 | 2.9 | 1.0 (times) |
| Impact strength, 20° C. kg-cm/mm) | 90 | 103 | 107 |
| −5° C. | 70 | 41 | 107 |
| Heat shrinkage | 0.35% | — | 0.66% |
| Heat seal strength | 0.85 | 0.58 | 1 (times) (6.29 kg) |

(b) Properties of tubular body
 (1) Compression test:
  Sample and method: A cylindrical tube, 53 mm in diameter and 130 mm high, was pressed in the longitudinal direction at a rate of 10 mm/min. The results are shown below.

| Material | Thickness (mm) | n | Strength (kg) | Average |
|---|---|---|---|---|
| PP 50% + CaCO$_3$ 50% | 0.7 | 3 | 62, 58, 56 | 59 |
|  | 0.8 | 2 | 80, 76 | 78 |
|  | 0.9 | 3 | 113, 105, 104 | 107 |
| PP 100% (control) | 0.9 | 2 | 90, 90 | 90 |

Figure 10:
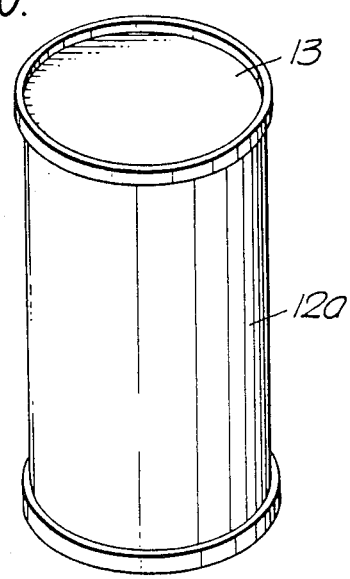
FIG. 10 is a perspective view showing an example of a round can of this invention.

(2) Resistance to heat of retorting
 Sample:
  A round can filled with 0.27 kg of water, with a PP lid fitted (FIG. 10).

-continued

Figure 11:
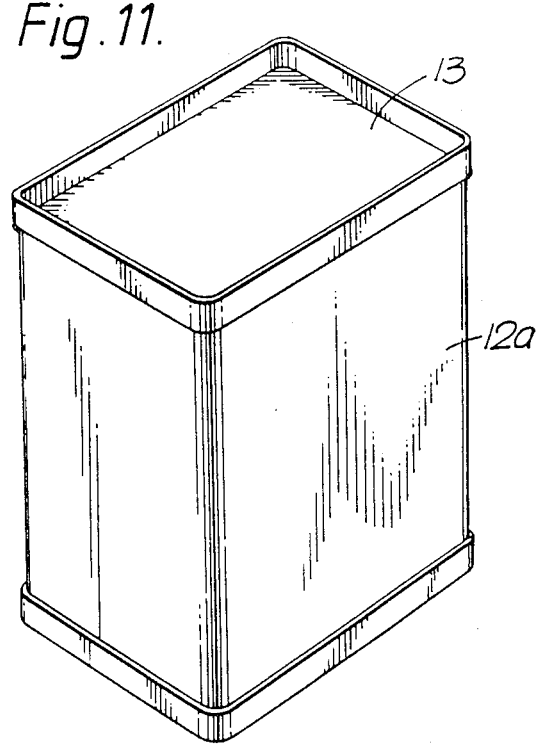
FIG. 11 is a perspective view showing an example of a square can of this invention.

A square can filled with 0.31 kg of water, with an aluminum lid fitted (FIG. 11).
Retorting conditions:
Rotary retorting sterilizer:
temperature: 125 to 130° C.,
pressure difference: 1.0 kg/cm$^2$
speed of rotation: 6 rpm
$F_0$ value = 15

| Can shape | Material | Retorting temperature | Thickness (mm) | Thermal conductivity kcal/m$^2$ hr. °C. | Deformation of body |
|---|---|---|---|---|---|
| Round | (PP 50% + CaCO$_3$ 50%) | 125° C. | 0.7 | 191 | None |
| " | " | 125° C. | 0.8 | 178 | None |
| " | " | 125° C. | 0.9 | 171 | None |
| " | PP 100% | 125° C. | 0.9 | 130 | None |
| " | Steel | 125° C. | — | 340 | None |
| Square | (PP 50% + CaCO$_3$ 50%) | 130° C. | 0.9 | — | None |
| " | PP 100% | 130° C. | 0.85 | — | None |

(3) Others
The incorporation of calcium carbonate or talc improved the ability of a round tube to be formed into a square tube.

(PP is polypropylene)

The tubular body of the above-mentioned structure may be further coated with plastic, as required, to improve the smoothness of the outside surface and to make the outside surface glossy. This smoothing treatment 11b is effective, particularly for the outermost layer formed by plastic incorporated with an inorganic matter, in which case the surface is rough.

The thickness of the tubular body 12 is constructed as mentioned above is determined such that the can be is self-supporting and the cans can be piled one over another. It is usually 300 to 3000 μ, and more suitably 500 to 1500 μ.

Figure 5:
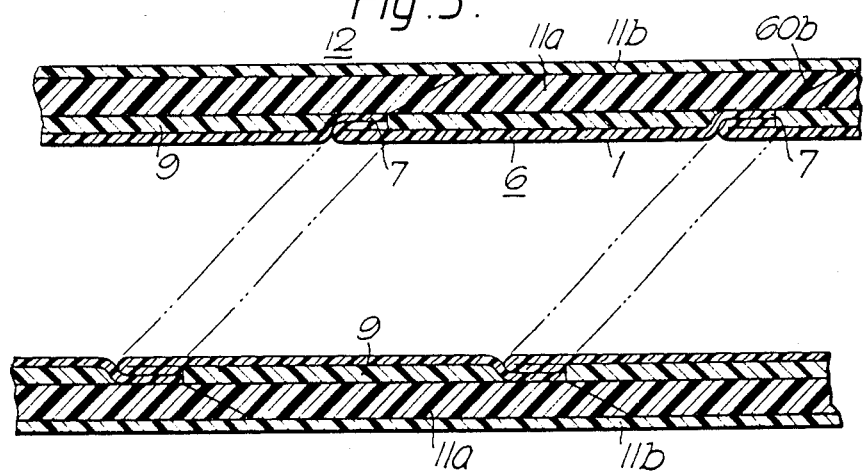
FIG. 5 is a sectional view of the completed tubular body, with the layer of plastic incorporated with an inorganic material and the smoothed layer laminated thereon.

FIG. 5 shows an example of the structure of the tubular body 12, and FIG. 6 is an enlarged view of the example of FIG. 5. The tubular body is made up of the laminated film 1, serving as the contents protecting layer, and the supporting layer. The former is made up of a 70 μ thick polypropylene layer A, a 7 μ thick carboxylic acid-grafted polypropylene layer B, a 9 μ thick aluminum foil C, a urethane-based adhesive layer D (4.5 g/m$^2$), and a 30 μ thick polypropylene layer E. The supporting layer is made up of a urethane-based adhesive layer F (4.5 g/m$^2$), a 200 μ thick polypropylene additional sheet 9, an approximately 600 μ thick coated plastics layer 11a, and a 10 to 20 μ thick surfacing layer 11b. The coated plastic layer 11a is made of a 1:1 mixture of polypropylene and calcium carbonate, and the surfacing layer 11b is made of polypropylene block copolymer.

Usually, the tubular body 12 as mentioned above is cut in lengths and then subjected to printing or labeling before it is put to use as the body member of a can. Prior to printing, the plastic coating may undergo corona treatment or flame treatment for smoothing.

Figure 7:
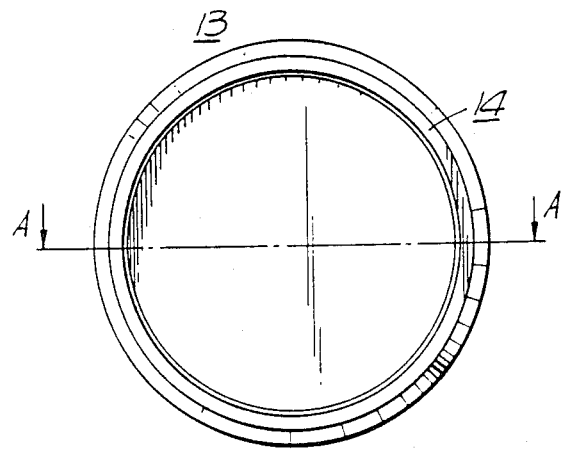
FIG. 7 is a plan view showing an example of the lid of a round can.
Figure 8:
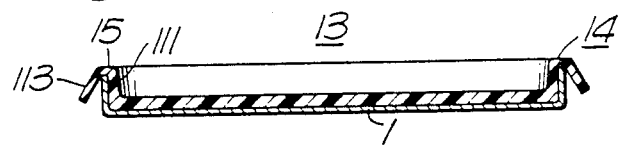
FIG. 8 is a sectional view taken along the line A—A of FIG. 7.
Figure 9:
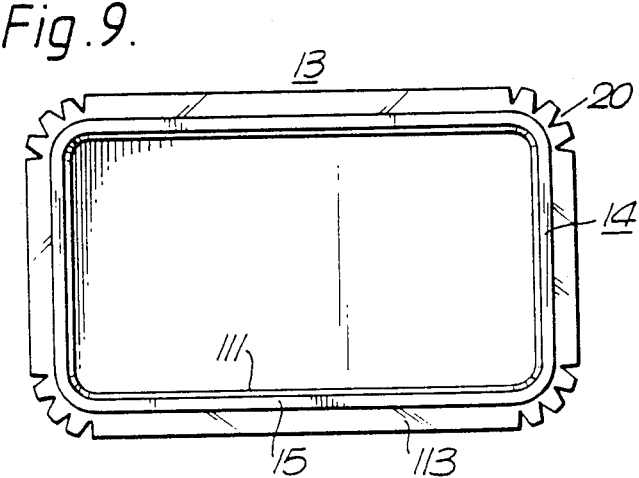
FIG. 9 is a plan view showing an example of the lid of a square can.

The lid 13 shown in FIGS. 7, 8 and 9 is fitted to the body member 12a comprising the tubular body 12 as mentioned above. The lid 13 shown in FIG. 7 and FIG. 8 is used for a round can. At the peripheral part of the lid is formed a peripheral ridge 14 which is made up of the inside wall 111, the top 15, and the outside wall 113. The top is fitted and bonded to the open end of the body m ember 12a. FIG. 8 is a sectional view taken in the direction of the arrows along the line A—A of FIG. 7. The back side of the peripheral ridge 14 is fitted to the open end of the container in the example, the inside wall 111 is bonded to the inside wall 111 of the open end of the container. For complete bonding with sufficient bond strength, the inside wall should be higher than 4 mm.

The lid 13 shown in FIG. 9 is used for a square can. It is basically of the same structure as the lid shown in FIG. 7, except that each corner of the outside wall of the peripheral ridge 14 has four notches 20.

Each of these lids 13 is formed by bonding the laminated film 1, which is used for the tube 6, to the inside of the injection-molded polypropylene lid.

FIG. 10 is a perspective view showing an example of the round plastic can of this invention, and FIGURE 11 is a perspective view showing an example of the square plastic can of this invention.

Now will be explained an example of the apparatus for producing the plastic can of this invention.

Figure 12:
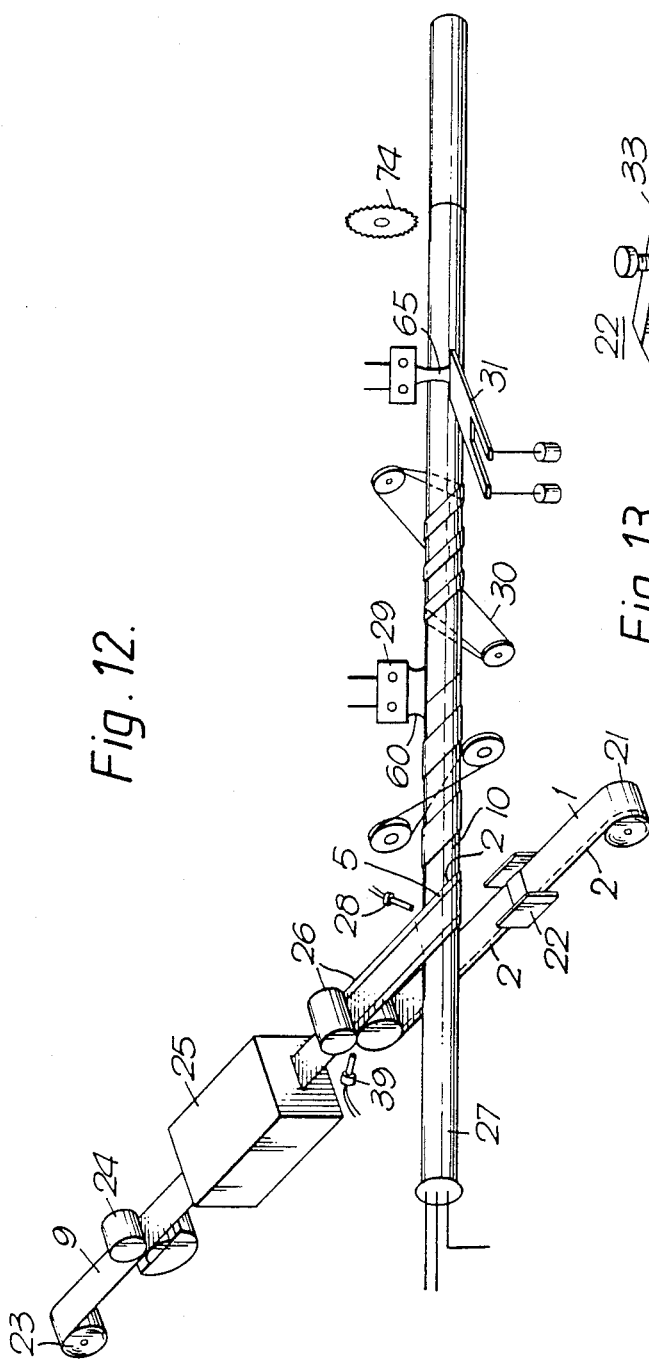
FIG. 12 is a schematic drawing illustrating an example of the apparatus for producing the tubular body.

FIG. 12 is a schematic drawing illustrating the apparatus for producing the tubular body 12.

There is shown at 21 a rollstock of the laminated film 1. The laminated film 1 is payed out from this rollstock 21. One side edge 2 of the laminated film 1 is folded back by the edge folding apparatus 22. The laminated film 1 then passes under the mandrel 27 and reaches the pressure roller 26. On the other hand, the additional sheet 9 is payed out from the rollstock 23. One side of its is coated with an adhesive by the adhesive applicator 24. Then, the adhesive is dried by the hot air dryer 25 and the additional sheet 9 is bonded to the laminated film 1 by the pressure rollers 26. The resulting laminated sheet 10, which has been formed by bonding the additional sheet 9 to the laminated film 1, is wound around the mandrel 27, and the overlapping side edges 2 and 5 are bonded each other by the air heater 28. The molten plastic 60 extruded from the T-die 29 is coated on the laminated sheet 10. The coated plastic is smoothed by the smoothing belt 30 and then by the doctor knife 31. Finally, the tubular body is cut in lengths by the circular saw 74.

Figure 42:
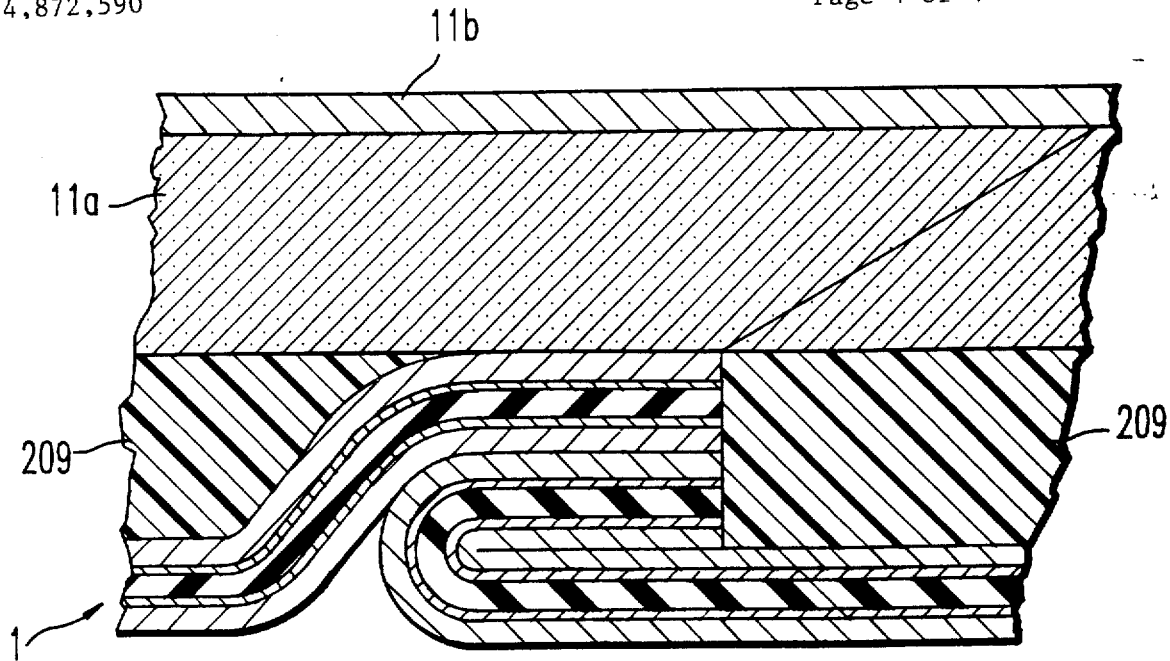
FIG. 42 is an enlarged partial cross section of a variation of the completed tubular body.

An enlarged partial cross section of a tube for the can body as a further embodiment of this invention is illustrated in FIG. 42. Basically, the laminar structure of this tube is the same as that illustrated in FIG. 6, except that a melt extruded polypropylene layer 209 having inorganic material is used in the place of a deposited sheet 9 and, as the result, a urethane type adhesive layer F (FIG. 6) is omitted. Spaced between layer 209 and the raised strips are eliminated and the small ridges at the opposite lateral edges of the raised strips are also absent.

This apparatus for the production of the tube is basically the same as an apparatus which is schematically illustrated in FIG. 12, except that the parts pertaining to the deposited sheet 9, i.e. a roll 23, a sizing device 24, and a hot air drier 25 shown in FIG. 12, are no longer used. In their place, the device illustrated in FIG. 43 is installed.

Figure 43:
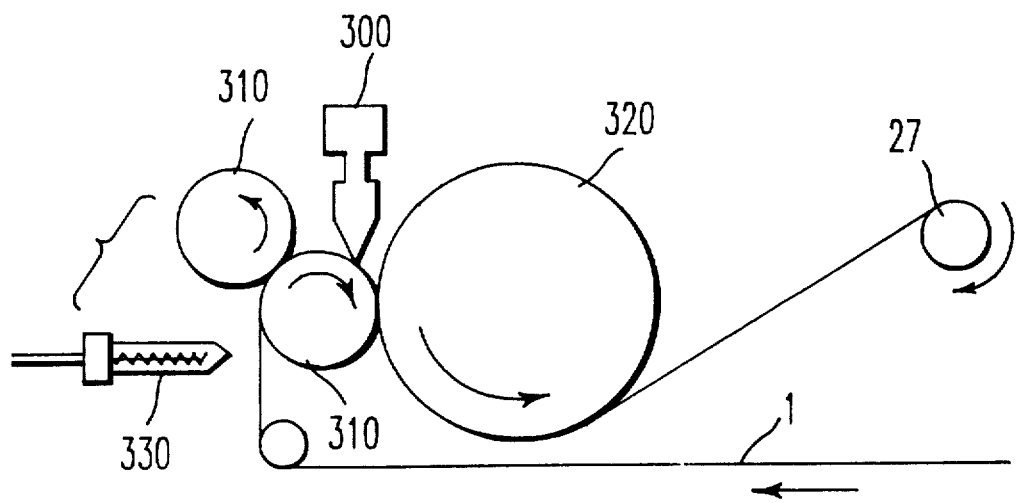
FIG. 43 is a partial side view of an apparatus for applying a melt extruded plastic layer.
Figure 44:
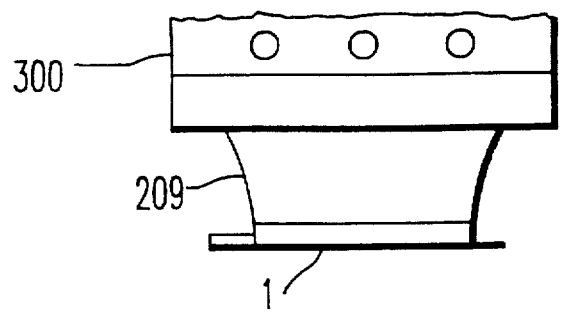
FIG. 44 is a schematic front view illustrating the molten plastic layer in a state of being extruded.

In the apparatus of FIG. 43, a T die 300 is disposed in a part of a press roll 310 and a cooling roll 320 is disposed in opposition to the press roll 310 with an intervening space three times the thickness of the laminated film. The laminated film 1 having one lateral edge thereof folded back by the edge-folding device is brought in from the righthand side of FIG. 43. The folded part is heated by a cartridge air heater 330 and then pressed down into fast union by the press roll 310. Via the T die 300, the molten plastic 209 is extruded with a prescribed width and applied on the laminated film 1 as illustrated in FIG. 44. The applied molten plastic is cooled by a cooling roll 320, rolled to an even thickness, and forwarded to the mandrel 27. Thereafter, the laminated film and the applied plastic are treated as illustrated in FIG. 12 to complete a tube for the can barrel.

Figure 13:
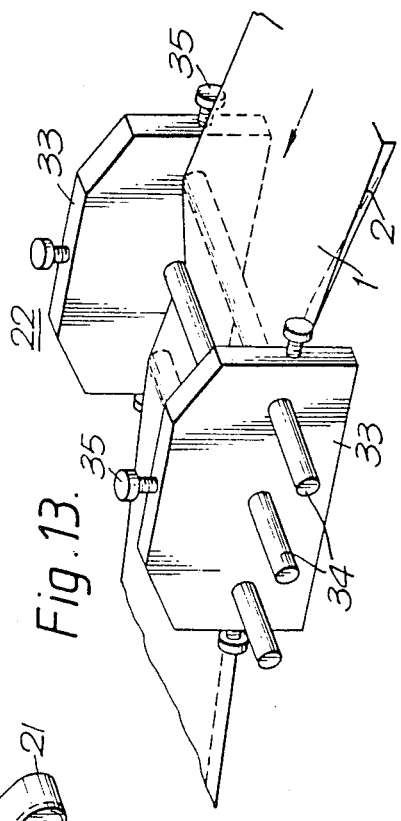
FIG. 13 is a perspective view showing an example of the edge folding apparatus which folds back one side edge of the laminated film.

FIG. 13 is a perspective view showing the edge folding apparatus 32. This apparatus is made up of two width regulating plates 33 and three rods 34 which adjust the space between the width regulating plates. Each rod slidably penetrates the width regulating paltes and is fastened by the screws 35. When the laminated film 1 is passed through this edge folding apparatus 22, one edge 2 of the lamiated film 1 is folded back continuously for a specified width. The edge folding apparatus 22 is not limited to this example. Folding may be accomplished by placing any member that defines the width at a position where the member applies a proper force toward the folding direction. In another embodiment, folding is accomplished by providing a rod that hits one edge 2 of the laminated film 1.

Figure 14:
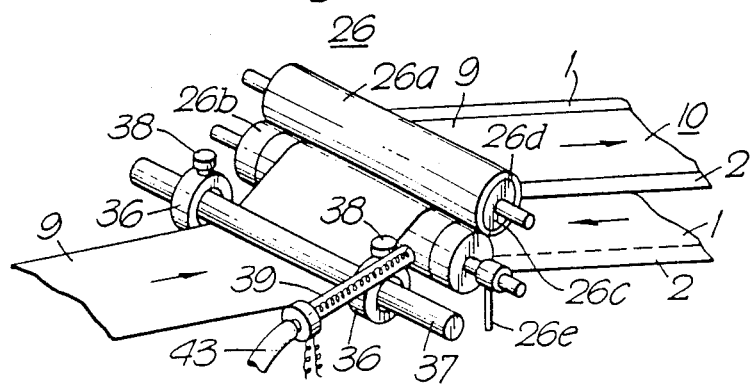
FIG. 14 is a perspective view showing the pressure rollers and the associated structure thereof.

FIG. 14 is a perspective view showing of the pressure rollers 26. The pressure rollers 26 press the folded part 2 of the laminated film 1 and bond it in such a manner that air bubbles are not entrapped. Moreover, the pressure rolles 26 bond the additional sheet 9 to the laminated film 1 in such a manner that air bubbles are not entrapped. This unit includes the upper roller 26a and lower roller 26b.

The upper roller 26a of the pressure roller 26 is covered with a thick rubber body 26d. It serves as the nip roll, and its vertical position can be be properly adjusted. The rubber body 26d increases the contact pressure between the rollers 26a and 26b because of its resilience, so that air bubbles between the laminated films 1 and 2 the folded part and between the laminated film 1 and the additional sheet 9 are expelled for complete bonding. The rubber body 26d should be formed of a heat-resistant rubber such as silicone rubber. The upper roller 26a is provided with a vertical position adjusting mechanism (not shown) that works such that the rollers 26a and 26b produce an adequate contact pressure.

The lower roller 26b is a metal roller provided with a drive mechanism (not shown) and a cooling water duct 26e. The drive mechanism is of variable speed type, so that the running speed of the webs 1 and 9 coincides with that of the laminated sheet 10 on the mandrel 27. Temperature control water (at 40° to 50° C.) introduced through the water duct 26e cools the lower roller 26b, removing heat from the additional sheet 9 and the side edge 2 of the laminated film 1, and preventing the webs 1 and 9 and the laminated sheet 10 from softening which could produce meandering and twisting.

At the place through which the additional sheet 9 is fed to the pressure rollers 26, there are two rings 36 which define the position of the additional sheet 9. The rings are slipped on the rod 37 and fixed at proper positions by the screws 38. The rings are intended to bring the additional sheet 9 to a desired position on the laminated film 1 so that the additional sheet 9 is accurately overlapped on the surface confined by the projecting stripe 7 formed by bonding the two side edges 2 and 5.

Figure 15:
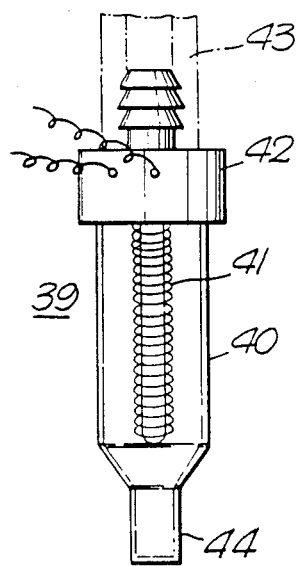
FIG. 15 is a side view showing the cartridge air heater.

The cartridge air heater 39, which is a local heating type heater, is directed to the folded part 2 of the lamianted film 1 passing over the lower roller 26b. FIG. 15 is a side view of the cartridge heater. This heater 39 is intended to heat and melt the folded part 2. It is made up of a glass tube 40 containing a heating wire 41, a socket 42 at the base of the glass tube, an air supply pipe 43 connected to the socket, and a nozzle 44 which blows out heated air.

The laminated film 1 with one side edge 2 folded back is fed to the pressure rollers 26 from the lower right in FIG. 14. Then, it is turned 180° by the lower roller 26b. As it is turned by the lower roller 26b, the folded part 2 is heated by hot air blown by the cartridge heater 39. The folded part 2 is then bonded by pressure when it is rolled by the upper roller 26a and lower rolle 26b. On the other hand, the additional sheet 9 is fed from the left in FIGURE 14. It is properly positioned by the two rings 36 when it passes over the rod 37. Then it is bonded to the laminated film 1 as it is rolled by the upper roller 26a and lower roller 26b. In this embodiment, the pressure rollers 26 perform contact bonding for the two parts simultaneously; but it is also possible to perform the contact bonding separately using two pairs of pressure rollers.

Figure 16:
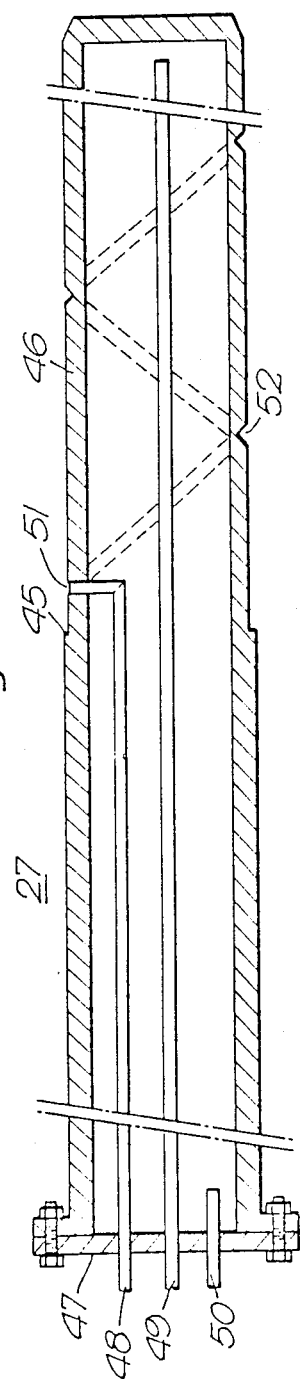
FIG. 16 is a sectional view showing the mandrel with a part omitted.

The web that has passed through the pressure rollers 26 is wound around the mandrel 27. The cross section of the mandrel 27 is shown in FIG. 16.

The mandrel 27 is an aluminum round pipe with both ends closed. The surface of the mandrel is treated with a fluoroplastic ("Teflon") so that the web wound thereon slips easily. (The Teflon treatment is accomplished by changing the surface into a porous hard aluminum oxide and then impregnating the porous structure with Teflon.)

Figure 17:
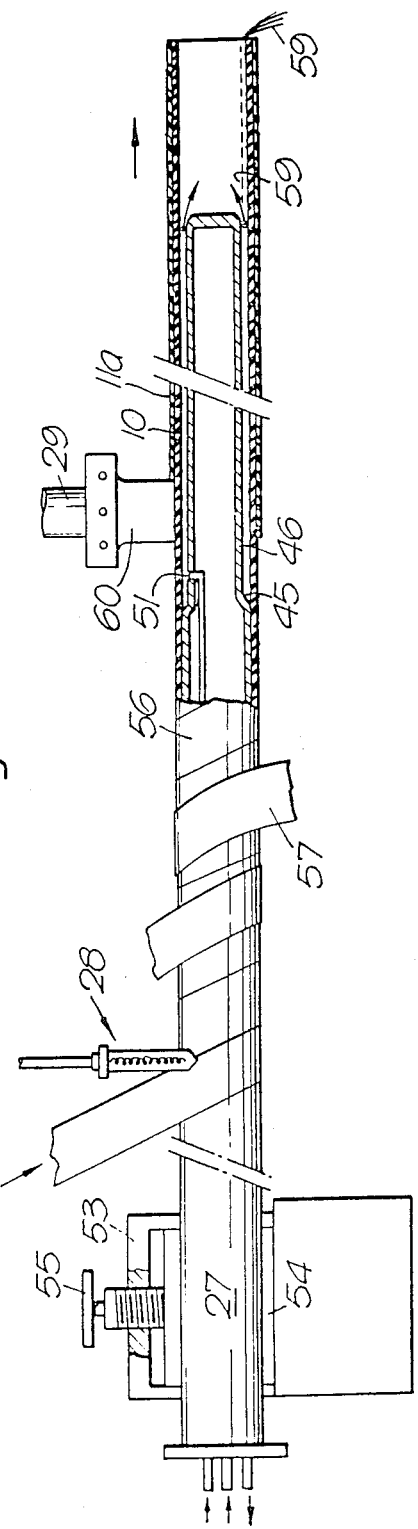
FIG. 17 is a partly sectional view showing the mandrel and the laminated sheet wound around the mandrel.

The mandrel 27 has a small step 45 at its middle, and the forward part of the mandrel beyond this step is the small diameter part 46 having a smaller diameter than the base part. To the base end of the mandrel is bolted the cover plate 47. The cover plate 47 is penetrated by the water duct 48, the water duct 49, and the discharge pipe 50. The water duct 48 supplies water to the space formed between the small diameter paert 46 of the mandrel and the tube 6 of the laminated film 1. The water duct 49 supplies water to cool the mandrel. The discharge port 51 of the water duct 48 is provided slightly forward from the step 45. The guide groove 52 which starts from the discharge port 51 is spirally formed over about one-third of the length of the small diameter part. As shown in FIG. 17, water supplied to the space between the small diameter part of the mandrel and the laminated sheet tube 56 cools the laminated sheet tube 56 and prevents the softening of the tube 6 and wrinkles due to expansion of the aluminum foil. In addition, the water layer floats the laminated sheet tube 56 so that it is moved forward smoothly. The guide groove 52 is intended to supply water uniformly so that the laminated sheet tgube 56 is floated easily.

The mandrel 27 is fixed almost horizontally, with the base end clamped by the two pressing plates 53, 54, as shown in FIG. 17. The handle 55 moves the pressing plate 53 up and down.

Figure 18:
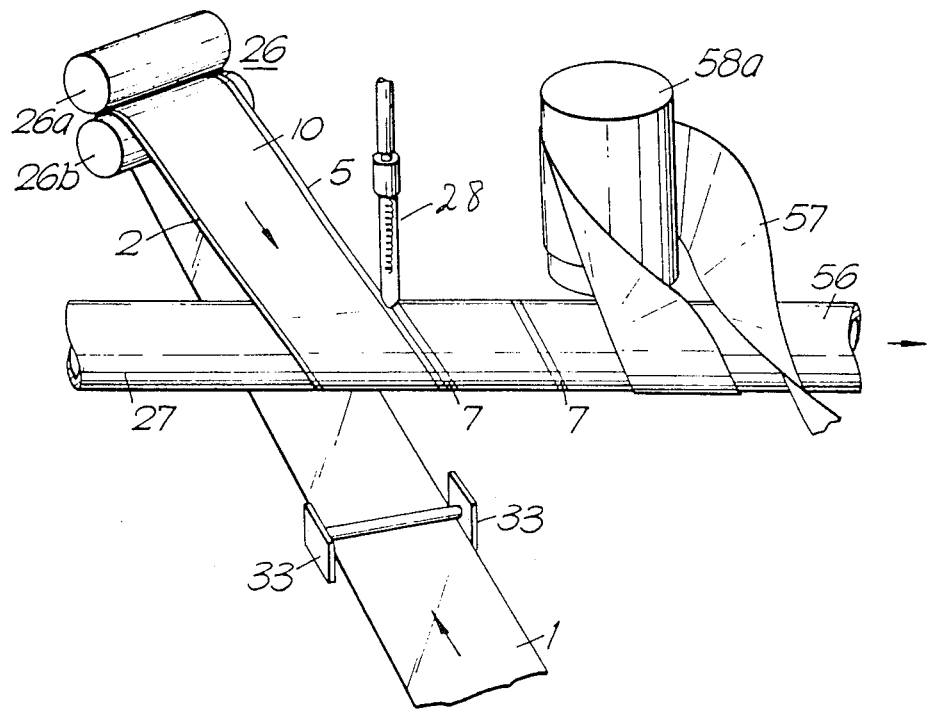
FIG. 18 is a perspective view illustrating how the laminated film is wound around the mandrel.

FIG. 18 is a perspective view showing the laminated sheet 10, which has been formed by pressure bonding of the additional sheet 9 onto the laminated film 1 by the pressure rollers 26, being wound around the mandrel 27. The laminated sheet 10 is wound in such a manner that the side edge 5 is overlapped on the folded part 2 of the laminated sheet 10 which has already been wound. Immediately before winding, the side edge 5 is heated by the cartridge air heater 28 which is identical to the one used before the pressure rollers 26 and the overlapped part is fusion-bonded by the tension generated by the pressure rollers 26 and the mandrel 27, in such a manner tha air bubbles are not entrapped.

The laminated sheet tube 56 formed on the mandrel 27 is caused to rotate on the fixed mandrel and to move forward by the delivery belt 57 which turns around the tube 56. Thus, the tube 56 is discharged from the mandrel.

Figure 19:
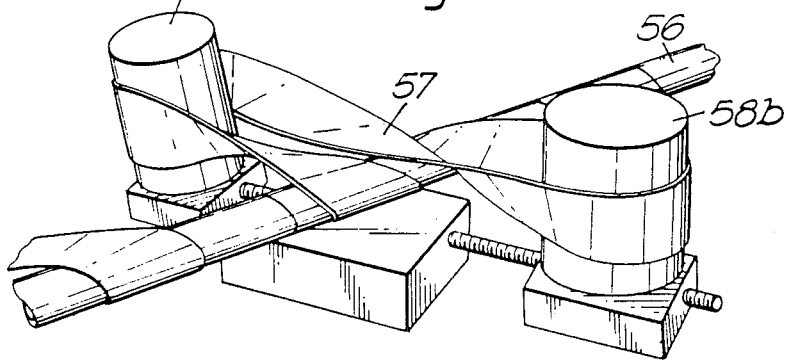
FIG. 19 is a perspective view showing the delivery belt that advances the wound tube.

FIG. 19 is a perspective view showing the mechanism of the delivery belt. The delivery belt 57 is sprially wound once around the laminated sheet tube 56, and is passed over a pair of rotating rolls 58a, 58b arranged on both sides of the mandrel 27. The rotating rolls 58a and 58b are driven by a motor (not shown). The rotating force causes the laminated sheet tube 56 to rotate and move forward.

The laminated sheet tube 56, with the overlapped part fusion-bonded, is then entirely coated with the molten plastic 60, which is mixed with an inorganic material and is delivered from the T-die 29, as shown in FIG. 17. The mixing of the inorganic material may be accomplished with a conventional mixing apparatus (not shown). The pellets of the mixture should be properly dried so that the water content is less than 300 ppm, and preferably less than 150 ppm. If the water content is more than 300 ppm, film breakage may occur in the molten plastic 60 that forms the coated plastic layer 11a. The coating of the molten plastic 60 should preferably be carried out on the small diameter part 46 of mandrel 27, because the laminated sheet tube 56 is cooled from its inside by the cooling water 59 delivered from the discharge port 51. This prevents the laminated sheet tube 56 from getting soft. The molten plastic 60 should be extruded onto such a position that the edge 60a is slightly shifted rightward from the projecting stripe 7, as shown in FIG. 6. If the edge 60a of the extruded resin is near to the projecting stripe 7, it is easy to smooth out the spiral projecting part 61 on the surface of the coated plastic layer 11a using the smoothing belt 30, which is mentioned later. If the joint 60b between the extruded resin layers is on the projecting stripe 7, bonding between the coated plastic layers 11a becomes poor. This is true particularly in the case where the laminated film 1 contains an aluminum foil which helps the projecting stripe 7 to cool rapidly.

Figure 20:
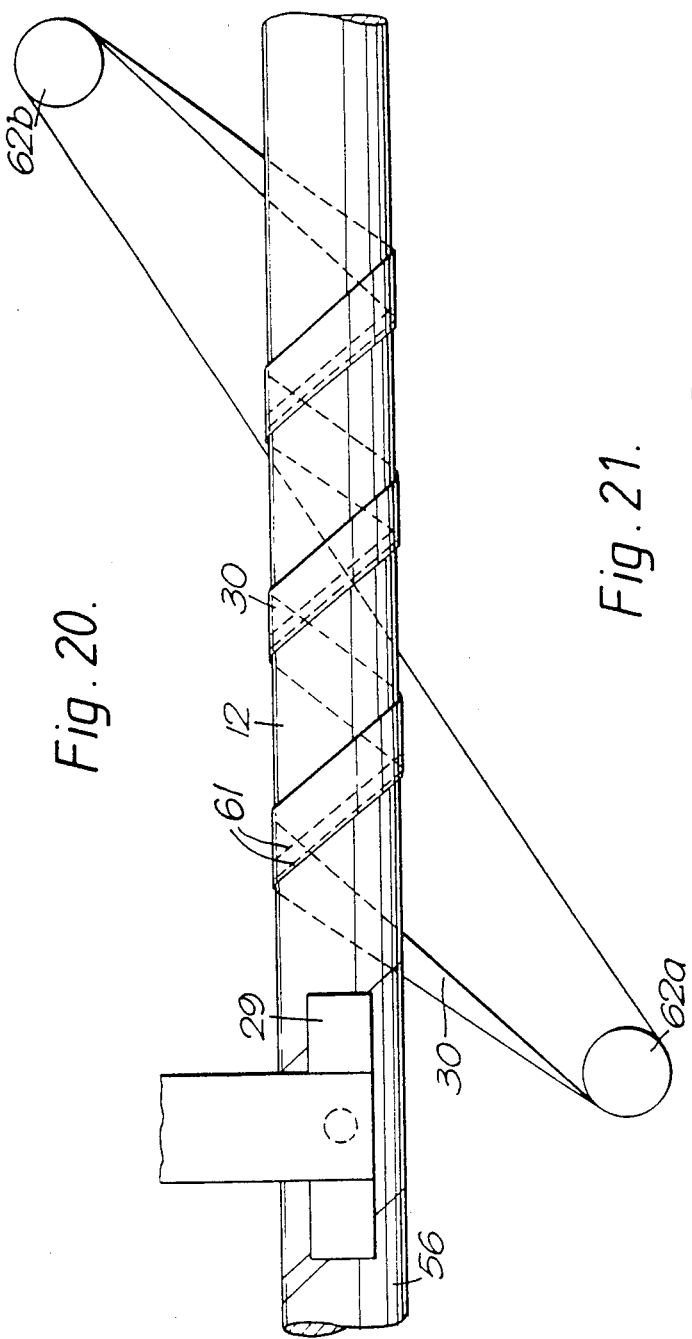
FIG. 20 is a plan view showing an example of the surface smoothing apparatus.

On the surface of the tubular body 12 coated with the molten plastic 60 is the spiral projecting part 61, as mentioned earlier. This spiral projecting part 61 should be smoothed out by the surface smoothing device before the coated plastic layer 11a solifies completely. The spiral projecting part 61 tends to appear above the projecting stripe 7 formed by the joint of the side edges 2 and 5. It also tends to appear above the joint of the coated plastic layer 11a. They should both be smoothed out as shown in FIG. 20. The surface smoothing device not only smooths out the projecting spiral part 61 but also secures the joint 60b, eliminating air bubbles.

Figure 21:
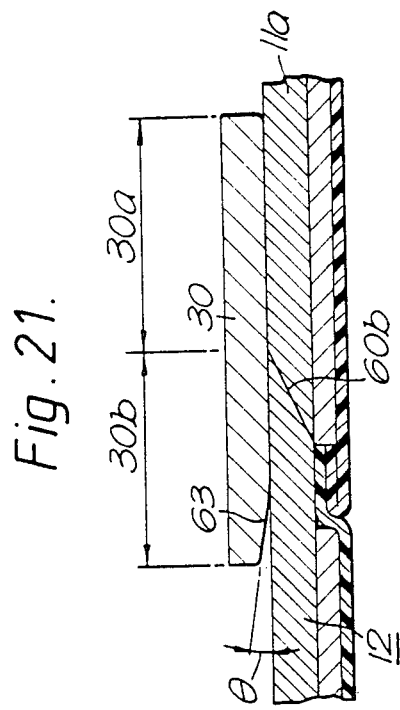
FIG. 21 is a sectional view showing the smoothing belt in contact with the tubular body.

FIG. 20 is a plan view showing an example of the surface smoothing apparatus. The smoothing belt 30 is wound three times around the spiral projecting part 61 and then passed over a pair of rolls 62a and 62b arranged at the lower sides of the mandrel 27. In operation, the drive roll 62b runs the smoothing belt 30 so as to smooth the spiral projecting part 61. FIG. 21 is a sectional view showing the smoothing belt 30 in contact with the tubular body 12. It is to be noted that the smoothing belt 30 has such a configuration that the lower side 63, on which the surface of the tubular body 12 to be smoothed out contacts, is slightly tapered and raised so that the belt 30 presses down the sprial projecting part 61 gradually. If the smoothing belt 30 is a simple flat belt, the edge of the belt will form a depressed part. The forward underside 63 smooths out the spiral projecting part 61, flattens the surface of the coated plastic layer 11a, and secures the joint 60b. The slope angle ($\theta$) of the forward underside 63 is 2° to 10°, and the length of the forward underside 63 is about one-fifth of the total width of the smoothing belt 30. The smoothing belt 30 should be positioned such that the part of the smoothing belt 30 indicated by 30a, which is about ½ to ¾ of the total width of the smoothing belt 30, covers the solidified part of the coated plsatic layer 11a, and the part of the smoothing belt 30 indicated by 30b, which is about ½ to ¼ of the total width of the smoothing belt 30, covers the molten part of the coated plastic layer 11a. If the size of the part 30b of the smoothing belt 30 is increased, the tubular body 12 is deformed by the pressure of the smoothing belt 30. For lubrication for the smoothing treatment, the surface of the smoothing belt is treated with silicone.

Figure 22:
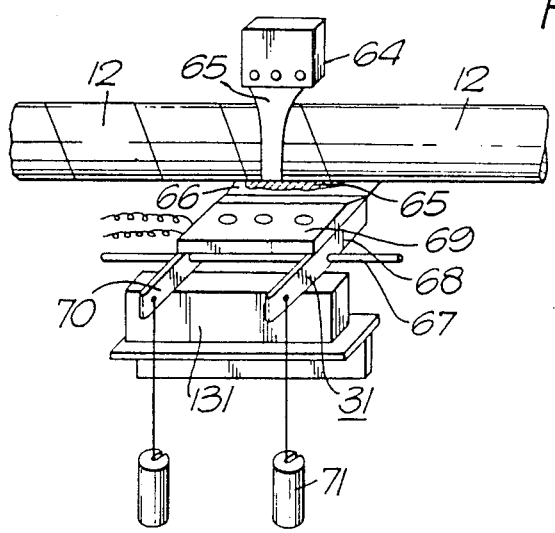
FIG. 22 is a perspective view showing an example of the surface smoothing apparatus.
Figure 23A:
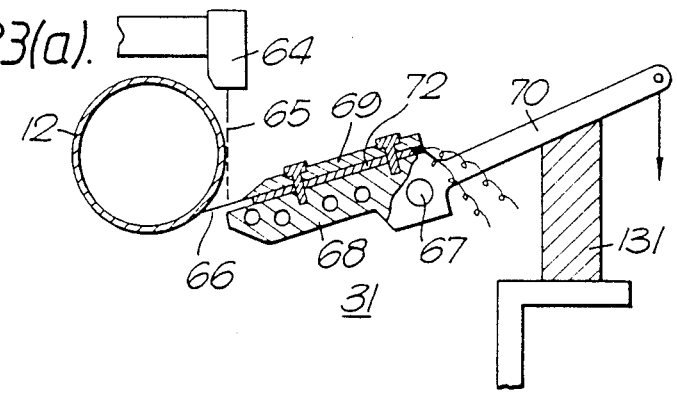
FIG. 23(a) is a sectional side view showing the surface smoothing apparatus.
Figure 23B:
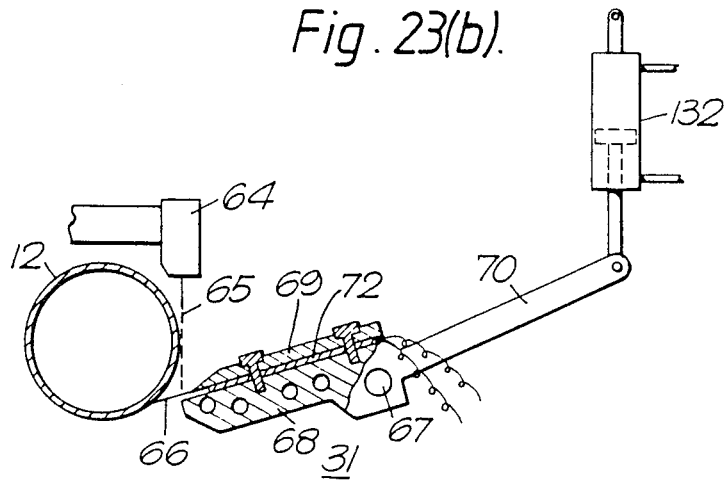
FIG. 23(b) is a sectional side view showing the surface smoothing apparatus, having an air cylinder in place of a silicone rubber block.

The tubular body formed as mentioned above is finally coated with the molten plastic 65, and the coated molten plastic is smoothed. FIGS. 22 and 23 show an example of the surface smoothing appartus including the doctor knife 31 which comes into contact with the lowe part of the tubular body 12. The molten plastic 65 fed from the die 64 is smoothly coated on the surface of the tubular body 12 by the elastic blade 66 of the doctor knfe 31. The elastic blade 66 is held between the blade holder 68 and the blade presser 69. The blade holder 68 is pivotally mounted on the axis 67. The elastic blade 66 is pressed against the tubular body 12 by the force exerted by the balance weights 71. The balance weights 71 are suspended from the levers 70 extending backward from both side edges of the blade holder 68. The doctor knife 31 is isolated from vibrations of the mandrel 27 by supporting the level 70 with a cushioning material 131 such as silicone rubber (as shown in FIG. 23(a)), or with an air cylinder 132 (as shown in FIG. 23(b)). Without the cushioning material, the doctor knife 31 will form a striped pattern on the surface of the tubular body 12. The blade holder 68 is provided with a built-in heater 72 so that the molten plastic 65 does not solidify on the leastic blade 66. The plastic coating by the elastic blade 66 makes the surface of the tubular body 12 completely flat, smooth, and glossy, so that the surface can receive printing directly.

The tubular body 12 which had undergone surface smoothing treatment advances beyond the forward end of the mandrel 27, as shown in FIG. 24. When the end of the tubular body 12 comes into contact with the switch actuator 73, the circular saw 74 comes down to cut the tubular body 12 in lengths. The tubular body sections 12 tumble down the slope 75 and are transferred to the subsequent step by the conveyor 76.

In the case where the tubular body 12 is used as a square can, the tubular body 12 is formed into a square tube. FIG. 25 shows an example of the square tube forming apparatus. The tubular body section (hereafter simply called a tubular body) 12 is transferred by the conveyor 76 to the conveyor 77. The tubular body 12 is then moved in its longitudinal direction by the conveyor 77. It passes through four guide rollers 78 arranged in a square. The parts to be bent are heated by the infrared line heaters 79. The surface between the bent parts is formed into an arcuate shape by the wheel roller 80. The tubular body is then expanded outward by the square tube forming mandrel 81 mounted on the turret 82. Thus, the sqrue tube 12 is formed.

As shown in FIG. 26, the infrared line heaters 79 are arranged at the positions corresponding to the parts to be bent. Each of the infrared line heaters has a concave reflector 83 which focuses on the part to be bent. Between the infrared line haters are arranged the auxiliary heaters 84 which help the surface between the bent parts to be formed flat easily. These auxiliary heaters may be unnecessary depending on the material and thickness of the tubular body 12. This system is advantageous in that the size and aspect ratio can be changed easily, and that polygonal prisms can be produced easily when the sahpe of the mandrel is changed and the number of the wheel rollers 80 are increased or decreased. Moreover, it is possible to change the lines speed easily by adjusting the length or voltage of the infrared line heaters.

Figure 27:
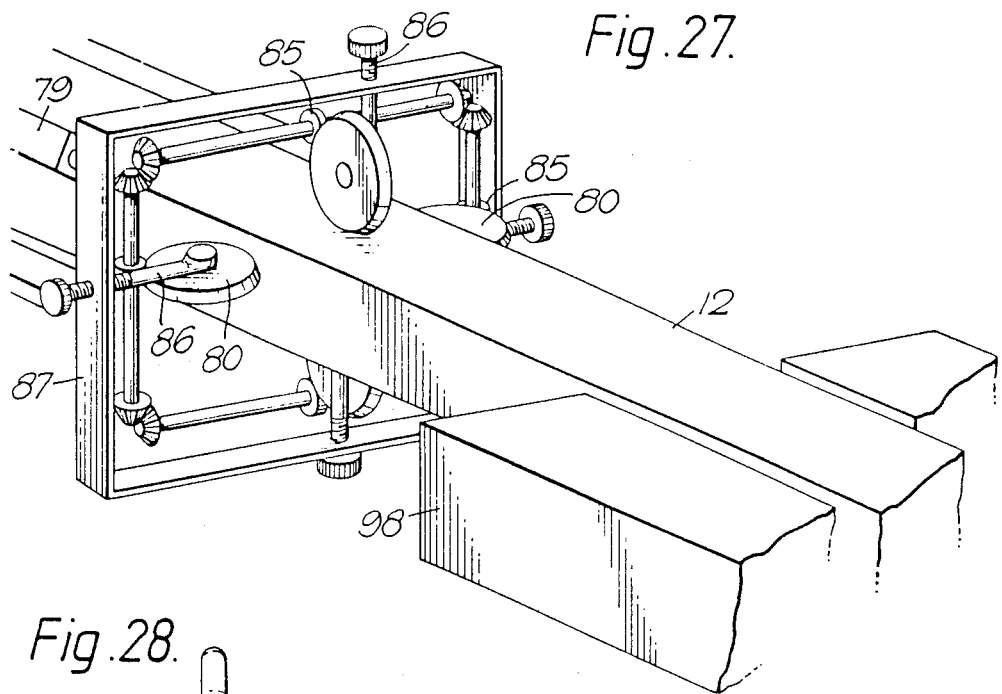
FIG. 27 is a perspective view showing an example of the apparatus which deforms the convex curved surface into a concave curved surface.
Figure 28:
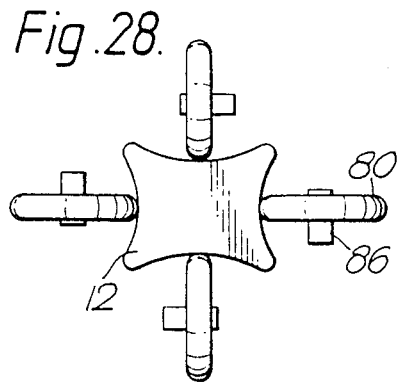
FIG. 28 is a sectional view showing how the deformation of FIG. 27 is accomplished.

After the parts to be bent have been softened, the surface between the parts to be bent is formed into an arcuate shape by the wheel rollers 80. FIG. 27 is a perspective view showing the wheel rollers. Each wheel roller 80 is of such a structure that the periphery of the metal disc is covered with rubber. It is driven by the small roller 85 which is in contact with the rubber periphery. Each wheel roller 80 is fixed to the frame 87 via the threaded rod 86. FIG. 28 is a sectional view showing the tubular body 12 being formed by the wheel roller 80.

Figure 29:
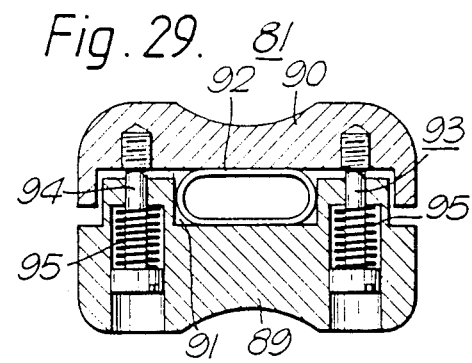
FIG. 29 is a sectional view showing an example of the square tube forming mandrel which expands a round tube outward to form a square tube.
Figure 30:
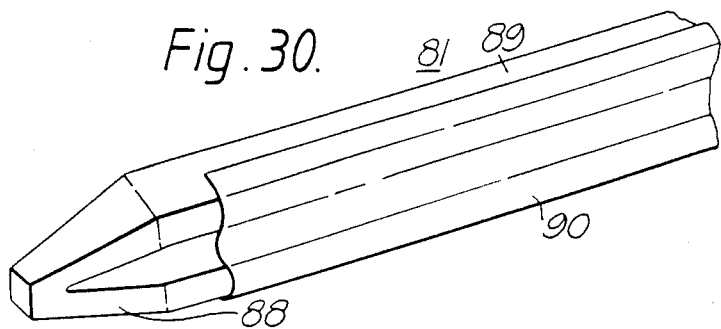
FIG. 30 is a perspective view showing the head of the mandrel.
Figure 31:
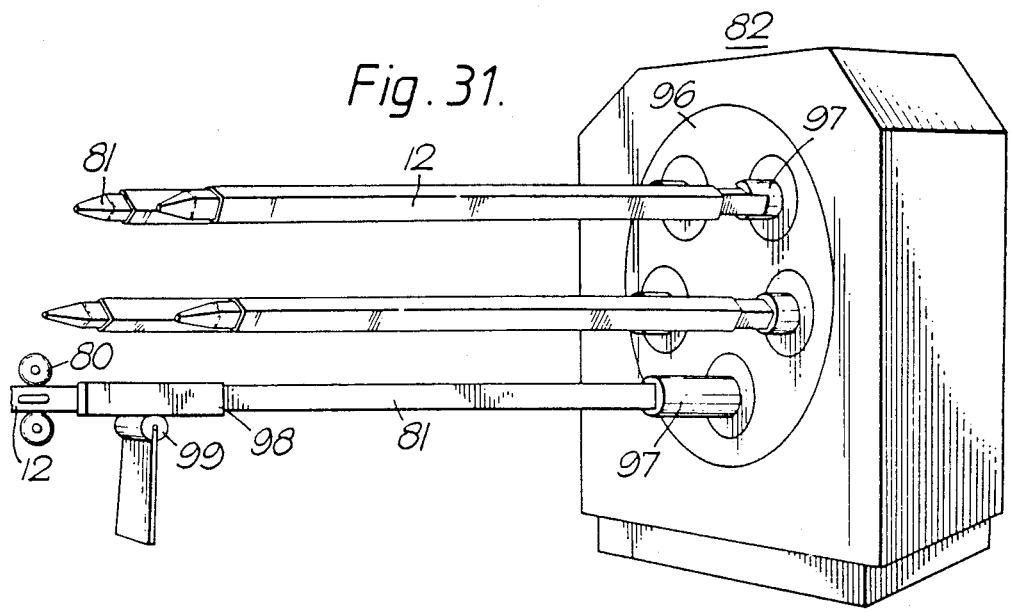
FIG. 31 is a perspective view showing the square tube forming mandrels mounted on a turret.

The tubular body 12 which has been formed by the wheel roller 80 is then slipped on the square tube forming mandrel 81. FIG. 29 is cross section of the sqrue tube forming mandrel 18, and FIG. 30 is a perspective view showing the head of the mandrel 81. The square forming mandrel 81 is a rodlike body having a square cross section and a tapered head 88. The tapered head helps the tubular body 12 to be slipped on the mandrel. The mandrel 81 is longitudinally split into two sections, the stationary rod 89 and the movable rod 90, excep the head 88 and base end (not shown) which are not so split. The stationary rod 89 has a longitudinal groove 91 on the side which mates with the movable rod 90. The longitudinal groove 91 houses a pneumatic tube 92. The movable rod 90 is slidably mounted on the stationary rod 89 by means of the screws 93. The screws 93 are arranged in pairs at several places along the longitudinal direction, and are screwed to the movable rod 90 via the stationary rod 89. The shank 94 of each of the screws 93 is surrounded by a spring 95 which moves the movable rod outward or inward as the pneumatic tube expands and shrinks.

Five of the square tube forming mandrels 81 are annularly mounted on the turret 82. The turret 82 has a large rotary disc 96 that rotates intermittently. The rotary disc has at equal intervals a shaft 97 which holds a square tube forming mandrel 81. The shafts 97 are movable back and forth.

The tubular body 12 is driven forward by the wheel rollers 80 and is then slipped on the square forming mandrel 81, with the movable rod 90 retracted. While the bent parts of the tubular body 12 are still soft, compressed air is introduced into the pneumatic tube 92. Thus, the movable rod 90 expands outward, forming the tubular body 12 into a square tube. The square tube forming mandrel 81 is guided by a guide palte 98 and is supported by a supporting roller 99. The shaft 97 of the mandrel upon which the tube is mounted then axially retracts, with the square tube forming mandrel 81 expanded and the tubular body held by the mandrel 81. Then, the rotary disc 98 turns one-fifth. The next shaft advances to cause the square tube forming mandrel 81 fixed thereon to receive the next tubular body 12. After four-fifths rotation of a given shaft, the square tube forming mandrel 18 retracts the movable rod 90, permitting the cooled tubular body 12 to be extracted from the mandrel 81.

Figure 32:
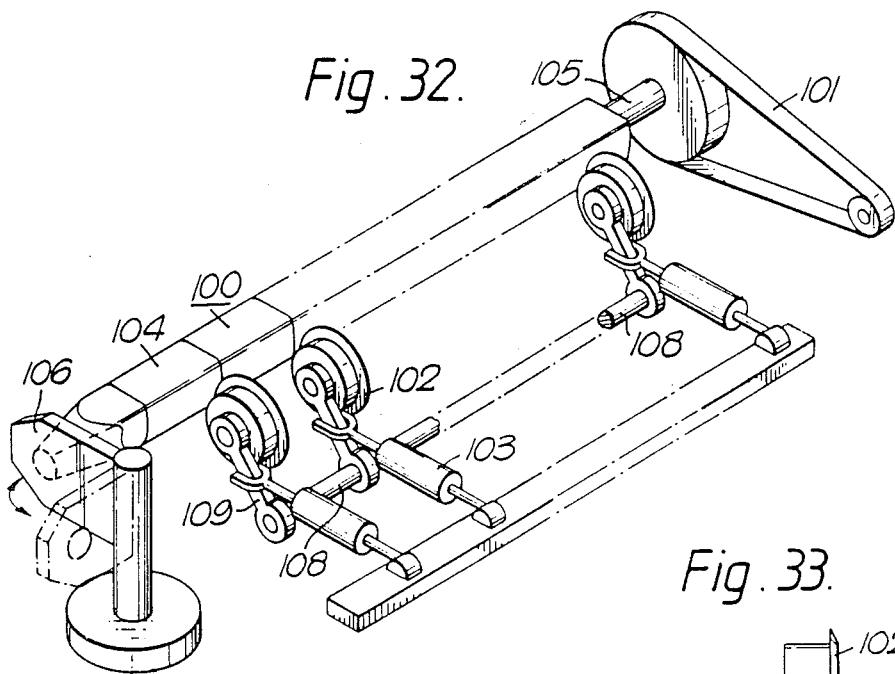
FIG. 32 is a perspective view showing an example of the cutting apparatus which cuts the tubular body in lengths.
Figure 33:
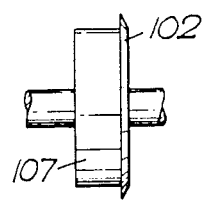
FIG. 33 is a side view of the circular blade.

The square tube thus produced, or the round tube which does not underog square tube forming, is then cut in lengths according to the desired can length. FIGURE 32 is a perspective view showing an example of the cutting apparatus. This cutting apparatus is made up of the receiving shaft 100 which supports the tubular body, the shaft drive mechanism 101, the circular blades 102, and the air cylinder 103 which presses the circular blades 102 against the receiving shaft with a fixed pressure. The receiving shaft 100 is covered with plastic 104 for protection of the circular blades 102. One end of the receiving shaft 100 is removably mounted on the drive shaft 105 by means of a claw (not shown). The other end of the receiving shaft 100 is supported by the shaft end supporting plate 106, which swings about 90° after the tubular body 12 (not shown) is slipped on the shaft 100. On one side of each circular blade 102 is a circular plastic guide 107 which is slightly smaller in diameter than the blade and is arranged concentrically with the circular blade 102, as shown in FIG. 33. This guide prevents the circular blade 102 from advancing more than necessary beyond the tubular body. A multiplicity of the circular blades 102 are provided, each being rotatably mounted on the upper end of the arm 109, with teh lower end thereof rotatably mounted on the axles 108.

The circular blades 102 are pressed with a prescribed pressure against the receiving shaft 100 by the damper action of the air cylinder 103 attached to the middle of the arm 109. As the receiving shaft 100 rotates, the tubular body 12 is cut at prescribed intervals. When cutting is complete, the shaft end supporting plate 106 is turned 90°, and the tubular body is removed from the receiving shaft 100.

This apparatus is capable of cutting both round tubes and square tubes of any size, if the receiving shaft 100 is replaced. Cutting with this apparatus is accomplished by pressing the blades having the guides 107 against the plastic shaft 100. This cutting method is advantageous in that the circular blade 102 does not receive an excessive force even when it cuts a square tube and therefore the life of the blade is extended. Moreover, unlike the conventional press cutting, the cutting method accomplishes neat cutting because the blade reaches into the plastic shaft 100. Another advantage is that the blade is not exposed more than necessary owing to the guide 107. This is preferred from the standpoint of safety.

Figure 34:
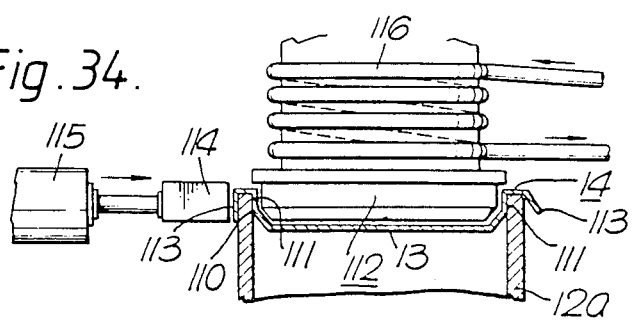
FIG. 34 is a side view illustrating an example of the high-frequency heating apparatus which seals the lid for the square can.
Figure 35:
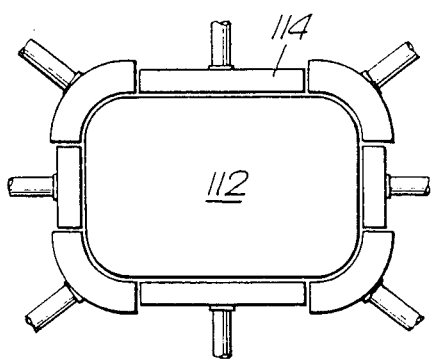
FIG. 35 is a plan view showing the major parts of the high-frequency heating apparatus.

The open end 110 of the body member 12a which is formed by cutting the tubular body 12 in lengths is then provided with the lid 13 as shown in FIG. 34. The inside wall 111 of the peripheral ridge 14 of the lid 13 is heated by a high-frequency heating unit while being held down by the die block 112. The high-frequency unit heats the aluminum foil in the laminated film 1 and the heated aluminum foil metls the plastic lamianted therein. (See FIG. 8.) Then, the pressing block 114 is pressed against the outside wall 113 of the peripheral ridge 14. This fusion-bonds the inside wall 111 of the peripheral ridge 14 to the inner periphery of the open end. The pressing block 114 is divided into several sections as shown in FIG. 35, so that each section is moved back and forth by the cylinder 115. The pressing block 114 is made of a non-metallic material so that it is not affected by the high frequency coil 116. The high-frequency coil 116 is cooled by water inside.

Figure 36:
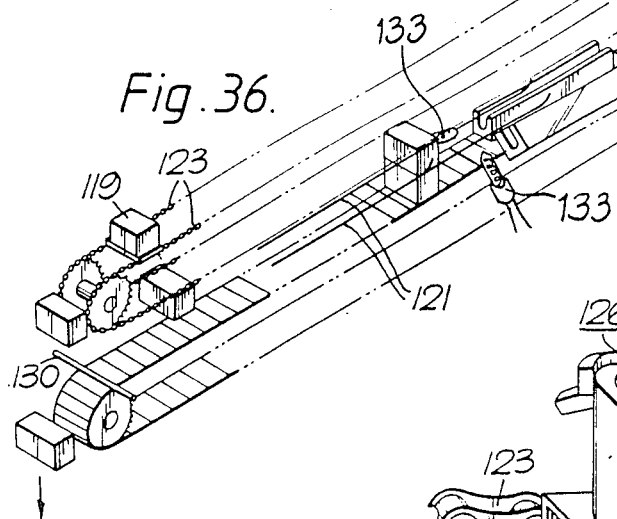
FIG. 36 is a schematic drawing illustrating an example of the apparatus for fusion bonding the lid.
Figure 37:
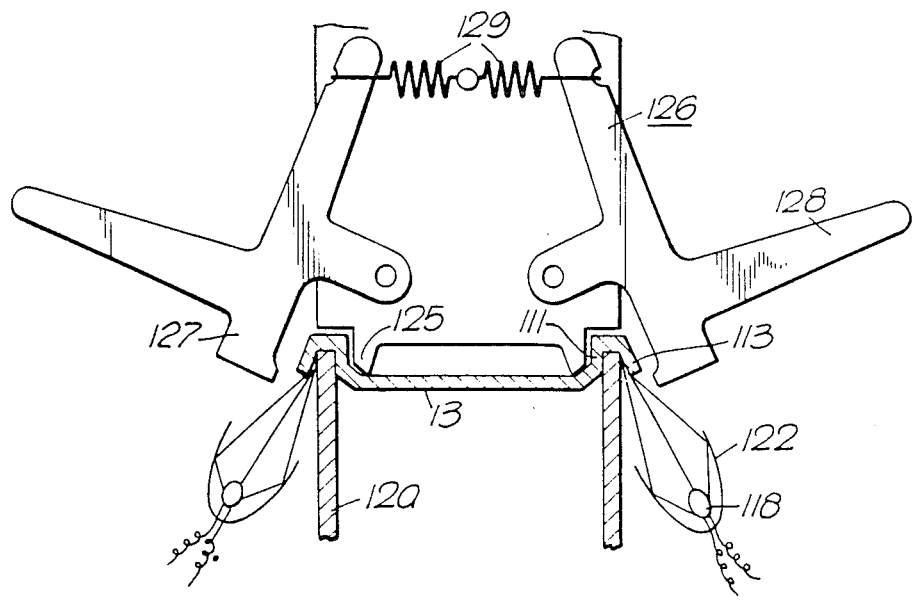
FIG. 37 is a schematic drawing illustrating how heating is accomplished.
Figure 39:
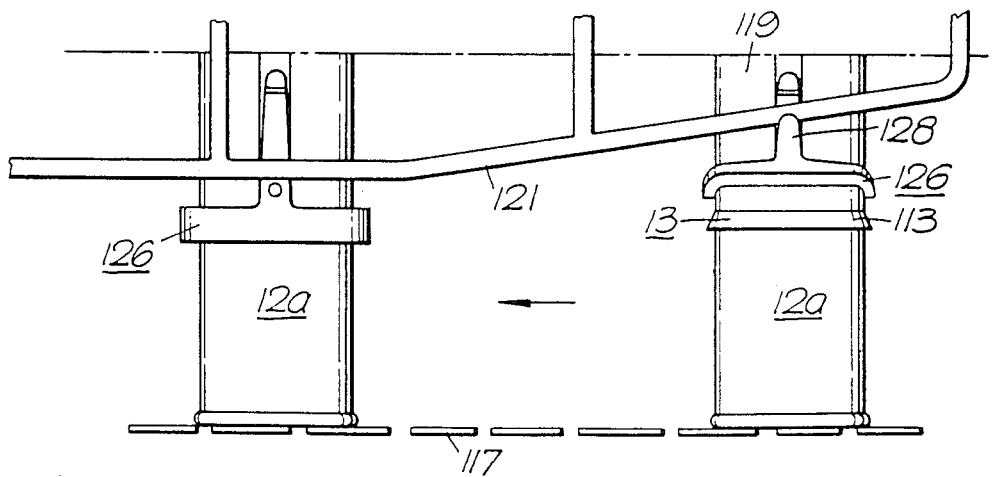
FIG. 39 is a side view illustrating the action of the pressing tool.

After the fusion bonding is performed for the inside wall 111 of the lid 13, the outside wall 113 is fusion-bonded using the apparatus as shown in FIGURE 36. This apparatus is made up of the chain belt conveyor 117, the infrared line heater 118, the chain coveyor 120, and the guide bars 121. The chain belt conveyor 117 transfers the body member 12a with the lid 13 attache.d The infrared line heater 118 heats the external surface of the open end of the body member 12a and the internal surface of the outside wall 113 of the lid 13, the outside wall 113 of the lid 13 attached to the body member 12a being still open. The chain conveyor 120 is installed above and parallel to the chain belt conveyor 117, and is provided with the presing tools 119 which press down the lid 13. The infrared line heaters 118 are each provided with a concave reflector 122 focusing on the gap between the external surface of the open end of the body member and the outside wall 113 of the lid 13 which is still open, as shown in FIG. 37. Two pairs of infrared line heaters 118 are arranged on both sides of the chain belt conveyor 117.

Figure 38:
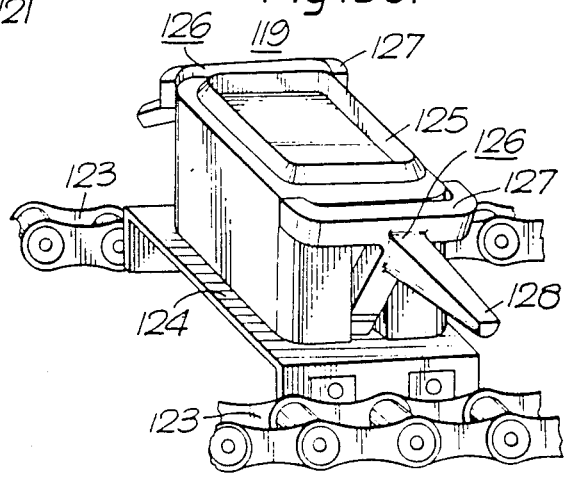
FIG. 38 is a perspective view showing the pressing tool.

The chain conveyor 120 is made up of two parallel stretched chains 123. A multiplicity of base plates 124 are mounted across the chains 123. Each base plate 124 is provided with a pressing tool 119. A perspective view of the pressing tool 119 is shown in FIG. 38. The pressing tool 119 is a box that mates with the tubular body member 12a. On the top of the box is a projecting peripheral stripe 125 which fits to the inside wall 111 of the lid 13. On both sides of the box are rotatable pressing units 126. These pressing units 126 have pressing heads 127 that match with the outside wall 113 of the lid 13. When the long outward projecting lever 128 is pushed up, the pressing head 127 presses the outside wall 113 of the lid 13 against the body member 12a.

In operation of this apparatus, the body member 12a with the lid 13 attached is brought by the chain conveyor 117 from the right side of FIG. 36. At the right end of the chain conveyor 120, the projecting peripheral stripes 125 of the pressing tool is caused to fit with the inside wall 111 of the lid 13. As the tubular body is further transferred leftward on the chain conveyor, the joint parts are heated by the infrared line heaters 118 and then the cartridge air heater 133. As the body member 12a is further transferred leftward on the chain conveyor 120, the levers 128 are pushed down gradually by a pair of the guide bars 121 installed above the chain conveyor 120. This action causes the outside wall 113 of the lid 13 to be contact-bonded to the body member 12a. As the levers pass the left end of the guide bar 121, the pressing units 126 are raised by the springs 129. At the left end of the chain belt conveyor, the body member 12a with the lid 13 sealed thereto is released by the baffle rod 130. The portion which is sealed by this apparatus is confined to two sides of the lid 13. Therefore, one more identical unit should be installed in series to seal the remaining sides.

In this apparatus, local heating air heaters such as cartridge air heaters may be added, as required, and the infrared line heater 118 may be omitted.

The fitting of lids to square cans can be performed using apparatuses as shown in FIGS. 34-39. In the case of round cans, the lid fitting is performed by the method as shown in FIGS. 40 and 41.

Figure 40:
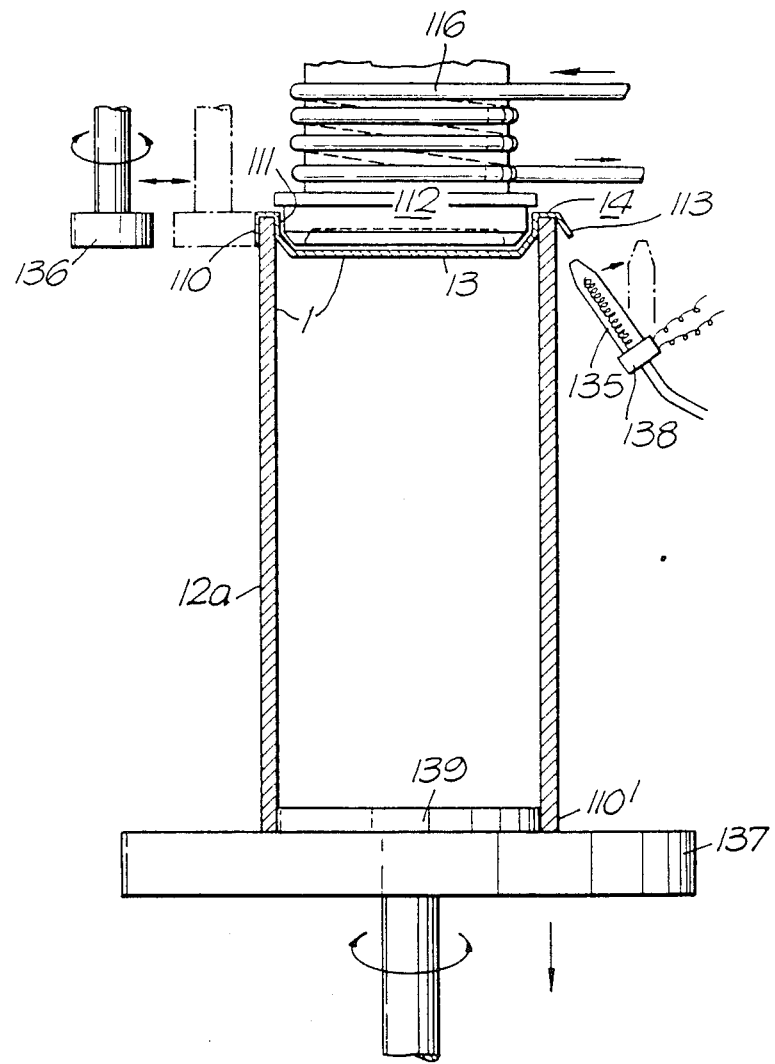
FIG. 40 is a schematic view illustrating an example of the apparatus for fitting a lid to a round can.
Figure 41:
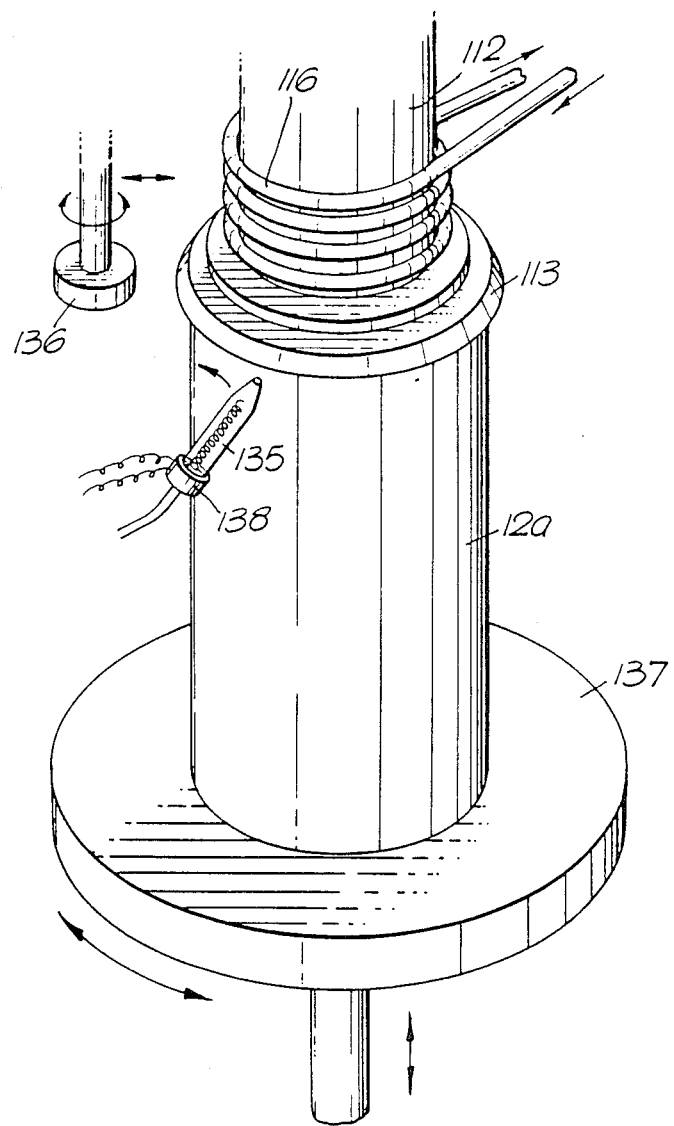
FIG. 41 is a perspective view showing the major parts of the apparatus shown in FIG. 40.

FIG. 40 illustrates the method for fitting the lid 13 to a round can. FIG. 41 is a perspective view showing the major parts of the apparatus as shown in FIG. 40. This apparatus is made up of a high-frequency coil 116 which heats the specific part, a die block 112 which supports the peripheral ridge of the lid from inside, a cartridge air heater 135, a pressing roller 136, and a turntable 137.

The high-frequency coil 116 heats the aluminum foil in the laminated film 1 constituting the content protecting layer and also the aluminum foil bonded to the inside of the lid 13, causing the internal wall 111 of the lid 13 to fusion-bond to the internal peripheral wall of the open end 110 of the body member 12a. The high-frequency coil 116 is internally cooled by water. The die block 112 is loosely inserted inot the high-frequency coil 116. The lower expanded part fits with the depressed dishlike part of the lid 13 and holds the lid 13 together with the body member 12a. It is turned slowly by an external drive mechanism (not shown). The bottom of the die block 112 is made concave. The cartridge air heater 135 heats the internal surface of the external wall 113 of the open lid 13 and the external surface of the open end 110 of the body member 12a, and fushion-bonds them together. The cartirdge air heater 135 turns 30° (between the vertical position to the inclined position) around the shaft at the socket 138. The pressing roller 136 presses the external wall 113 of the lid onto the body member 12a. Roller 136 is made of plastic. The roller 136 is rotatable and the entire assembly is movable in the lateral direction. The turntable 137 has at its center a projecting part 139 which fits to the lower open end 110' of the body member 12a or the concave top of the lid. It is rotatable and movable in the vertical direction.

This apparatus operates as follows to fit the lid 13. At first, the lower end of the body member 12a is fitted to the projection 139 of the turntable 137. The turntable 137 is lifted so that the upper surface of the lid 13 fits to the die block 112. The die block 112 is turned and the cartridge air heater 135 is inclined. The internal surface of the external wall 113 of the lid 13 and the external surface of the open end 110 of the body member 12a are heated. When the heating parts properly melt, the cartridge heater is returned to the vertical position and heating is stopped. The pressing roller 136 is moved laterlaly so that is presses the external wall 113 of the lid against the open end 110 of the body member 12a to achieve fusion bonding. Simultaneously with the movement of this pressing roller 136, the high-freuqency cil 116 generates high frequency so that the internal wall of the lid is heated and fusion-bonded. When fusion-bonding is complete, the pressing roller 136 is retracted from the lid 13. The turntable 137 is lowered. The body member 12a with the lid 13 fitted is dismounted. After filling, the other side of the body member 12a is sealed to the lid 13 in the same manner as mentioned above.

Obviously, numerous modifications and variations of the present invention are possible in light of the above teachings. It is therefore to be understood that within the scope of the appended claims, the invention may be practiced otherwise than as specifically described herein.

What is claimed as new and dsired to be secured by letters patent of the United States is:

1. A retortable structure comprising a cylindrical body and a resin layer formed on the outside thereof, said cylindrical body serving as a content protecting layer which is formed by spirally wrapping a lmainate film composed of a polyolefin layer, a gas barrier layer, and a plastic layer around a mandrel, with one side edge thereof folded back and outward and the folded part bonded such that air bubbles are not entrapped thereunder, simultaneously superimposing the other side edge of the laminate film on the folded part and bonding them together such that air bubbles are not entrapped between them, said resin layer having sufficient thickness and strength such that said resin layer alone rigidifies the body to be self supporting, said resin layer being formed by melt extrusion onto the outside of said cylindrical body, with said cylindrical body cooled with water passing through the gap between the cylindrical body being formed and the mandrel, said resin layer being surface-finished by a smoothing means after melt extrusion and thereby lacking seams or bends.

2. The structure of claim 1 wherein said resin layer incorporates an organic material.

3. A retortable structure cmprising:
   a cylindrical content protecting layer formed of a sprially wrapped laminate film, said laminate film being composed of a polyolefin layer, a gas barrier layer and a plastic layer, wherein one side edge of said spirally wrapped film is folded back and outward to form a folded part, said folded part being bonded to said laminate film and to another side edge of said laminate film such that air bubbles are not trapped between said folded part, said laminate film and said another side edge of said laminate film; and
   a resin layer formed on the outside of said content protecting layer, said resin layer having a smooth finished exterior surface lacking seams or bends and having a thickness and strength sufficient such that said resin layer alone rigidifies said structure so as to be self supporting during retorting.

* * * * *

UNITED STATES PATENT AND TRADEMARK OFFICE
CERTIFICATE OF CORRECTION

PATENT NO. : 4,872,590

DATED : October 10, 1989

INVENTOR(S) : HITOSHI SASAKI and SHOJI IGOTA

It is certified that error appears in the above-identified patent and that said Letters Patent is hereby corrected as shown below:

Column 5, line 7, change "than" to --that--;

Column 7, line 35, delete "be";

Column 7, the word bridging lines 41 and 42, change from "lamianted" to --laminated--;

Column 7, line 68, change "m ember" to --member--;

Column 8, line 29, change "its" to --it--;

Column 8, line 61, change "T die" to --T-die--;

Column 8, line 63, change "with" to --across--;

Column 9, line 2, change "T die" to --T-die--;

Column 9, line 11, change "32" to --22--;

Column 9, line 14, change "paltes" to --plates--;

Column 9, line 17, change "lamianted" to --laminated--;

Column 9, line 35 (first occurrence), delete "be";

Column 9, line 39, change "2 the folded part" to --the folded part 2--;

Column 10, line 13, change "rolle" to --roller--;

Column 10, line 40, change "paert" to --part--;

Column 11, line 4, change "tha" to --that--;

Column 11, line 11, change "sprially" to --spirally--;

Column 12, line 15, change "plsatic" to --plastic--;

Column 12, line 27, change "appartus" to --apparatus--;

Column 12, line 29, change "lowe" to --lower--;

UNITED STATES PATENT AND TRADEMARK OFFICE
CERTIFICATE OF CORRECTION

PATENT NO. : 4,872,590

DATED : October 10, 1989

INVENTOR(S) : HITOSHI SASAKI and SHOJI IGOTA

It is certified that error appears in the above-identified patent and that said Letters Patent is hereby corrected as shown below:

Column 12, line 32, change "knfe" to --knife--;

Column 12, line 47, change "leastic" to --elastic--;

Column 13, line 4, change "squre" to --square--;

Column 13, line 9, change "haters" to --heaters--;

Column 13, line 16, change "sahpe" to --shape--;

Column 13, line 34, after "is" insert --a--; also change "cross section" to --cross-section--; also change "squre" to --square--;

Column 13, line 35, change "18" to --81--;

Column 13, line 37, change "rodlike" to --rod-like--;

Column 13, line 41, change "excep" to --except--;

Column 13, line 67, change "palte" to --plate--;

Column 14, line 12, change "underog" to --undergo--;

Column 14, line 35, change "teh" to --the--;

Column 14, line 65, change "metls" to --melts--; also change "lamianted" to --laminated--;

Column 14, line 68, change "fusion-bonds" to --fusion bonds--;

Column 15, line 6, change "high frequency" to --high-frequency--;

Column 15, line 12, change "coveyor" to --conveyor--;

Column 15, line 21, change "presing" to --pressing--;

Column 15, line 22, after "lid 13" insert --The guide bars 121 actuate the pressing tools 119.--;

UNITED STATES PATENT AND TRADEMARK OFFICE
CERTIFICATE OF CORRECTION

PATENT NO. : 4,872,590

DATED : October 10, 1989

INVENTOR(S) : HITOSHI SASAKI and SHOJI IGOTA

It is certified that error appears in the above-identified patent and that said Letters Patent is hereby corrected as shown below:

Column 15, line 48, change "stripes" to --stripe--;

Column 16, line 19, change "inot" to --into--;

Column 16, line 50, change "laterlaly" to --laterally--;

Column 16, line 53, change "high-freuqency cil" to --high-frequency coil--;

Column 16, line 67, change "dsired" to --desired--;

Column 17, line 4, change "lmainate" to --laminate--;

Column 18, line 3, change "cmprising:" to --comprising:--;

Column 18, line 5, change "sprially" to --spirally--.

The sheet of drawing consisting of Figures 42-44 should be added as shown on the attached sheet.

Signed and Sealed this

First Day of December, 1992

Attest:

DOUGLAS B. COMER

Attesting Officer      Acting Commissioner of Patents and Trademarks